US011401116B1

(12) United States Patent
Covelle et al.

(10) Patent No.: US 11,401,116 B1
(45) Date of Patent: Aug. 2, 2022

(54) ADJUSTABLE PACKAGE FLOW STOP WALL SYSTEMS AND ASSOCIATED METHODS

(71) Applicant: Amazon Technologies, Inc., Seattle, WA (US)

(72) Inventors: Kristin Covelle, Melrose, MA (US); Nicholas Mark Johnson, Westford, MA (US); Brian Steven Merrow, Bolton, MA (US); Krista Ohlson, Newton, NH (US); John Waldron, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/346,827

(22) Filed: Jun. 14, 2021

(51) Int. Cl.
*B65G 47/88* (2006.01)

(52) U.S. Cl.
CPC ................................ *B65G 47/8823* (2013.01)

(58) Field of Classification Search
None
See application file for complete search history.

(56) References Cited

U.S. PATENT DOCUMENTS 1,669,497 A * 5/1928 Steegmuller ......... B65G 47/295 193/35 A
2,115,647 A * 4/1938 Ross ...................... B65G 65/24 193/32
2,500,699 A * 3/1950 Fukashi .................. B65B 35/54 53/153
3,377,771 A * 4/1968 Schmidt, Sr. ............. B65B 5/08 53/153
3,416,642 A * 12/1968 Muller ................. B65G 47/261 198/781.08

* cited by examiner

*Primary Examiner* — William R Harp
(74) *Attorney, Agent, or Firm* — Athorus, PLLC

(57) ABSTRACT

Adjustable package flow stop wall systems and associated methods may operate as part of package processing stations, in order to facilitate accumulation and transfer of packages from inbound collection areas to outbound conveyances. For example, an adjustable package flow stop wall may include a wall assembly, a frame assembly, a pedal assembly, and/or a handle assembly. The wall assembly may selectively extend above the upper surface of a station between a plurality of positions, e.g., a closeout position, an active position, and a flush position, and the pedal and/or handle assemblies may be actuated to cause movement of the wall assembly. Further, the adjustable package flow stop wall may include one or more sensors, actuators, and/or input elements to enable movement of the wall assembly at least partially or fully automatically, which movements may be based on detected agents and/or packages and associated characteristics.

19 Claims, 14 Drawing Sheets

ADJUSTABLE PACKAGE FLOW STOP WALL SYSTEMS AND ASSOCIATED METHODS

BACKGROUND

Many companies may store, package, sort, and ship items and/or groups of items from material handling facilities. For example, many companies may receive and store items in a material handling facility, and then pick, pack, sort, and ship items to various destinations (e.g., customers, stores) from the material handling facility. Various material handling processes may be used to grasp, lift, transfer, place, and sort various items or packages. Accordingly, there is a need for safe, ergonomic, reliable, and efficient systems and methods to facilitate the various material handling processes within a material handling facility, thereby improving the safety, speed, reliability, and efficiency of such processes.

DETAILED DESCRIPTION

Figure 1A:
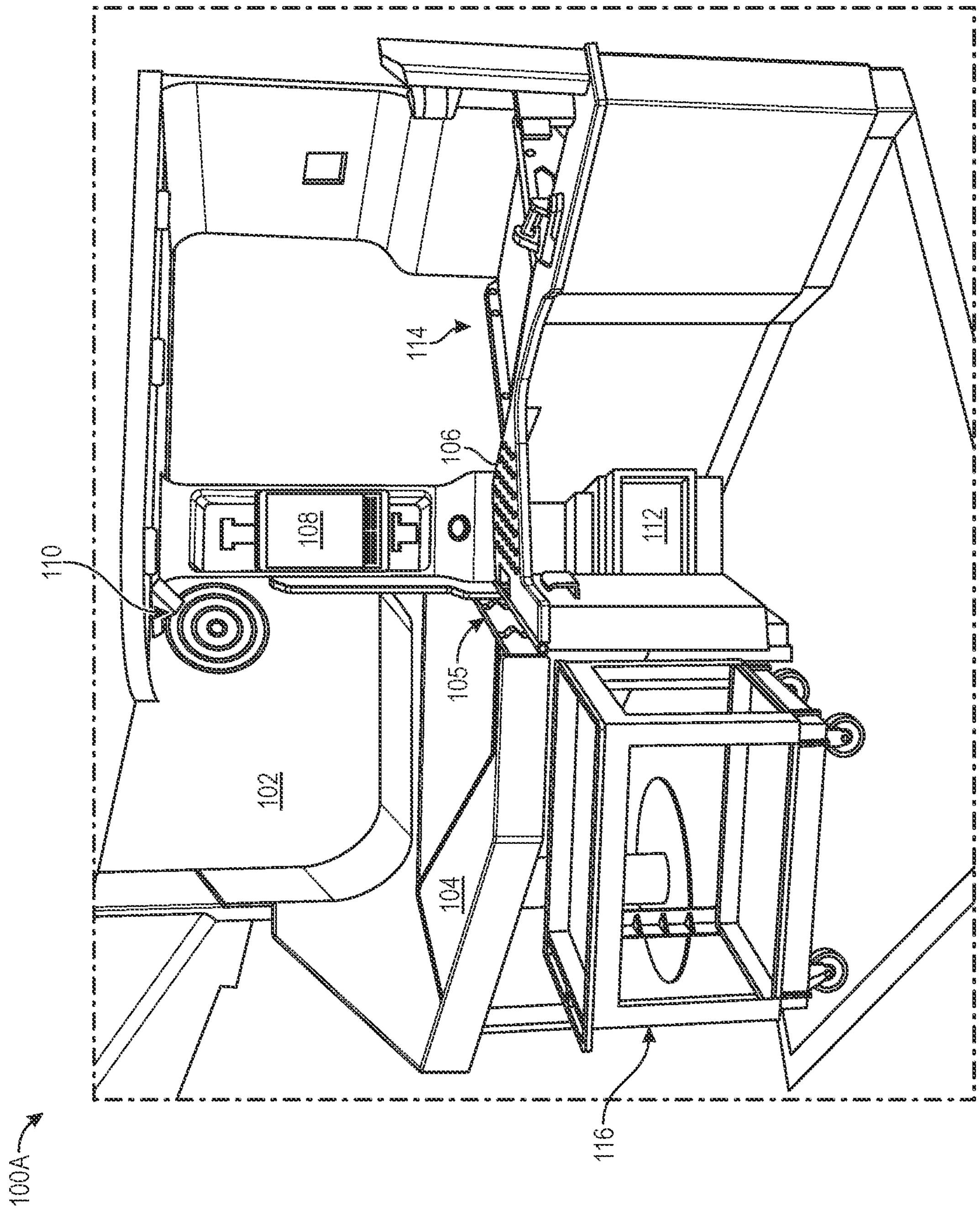
FIG. 1A is a schematic, perspective view diagram of an example package processing station including an adjustable package flow stop wall, in accordance with implementations of the present disclosure.

As is set forth in greater detail below, implementations of the present disclosure are directed to adjustable package flow stop wall systems and associated methods that may be used with various package or item processing stations in material handling facilities.

In example embodiments, various stations in material handling facilities may be used to induct, transfer, sort, or otherwise move packages between various upstream and downstream processes or stations. The packages may comprise one or more boxes, containers, envelopes, items, or other objects. A plurality of packages may arrive or accumulate at collection areas of various stations from various upstream processes, and the plurality of packages may be scanned, identified, and transferred to various downstream processes.

In order to control and facilitate the flow of packages to and through a station, the adjustable package flow stop wall described herein may move between a plurality of positions relative to an upper surface of the station, including an extended or closeout position, an intermediate or active position, and a retracted or flush position, among other possible positions.

For example, in the extended or closeout position, the adjustable package flow stop wall may hold or accumulate packages in the collection area for an agent at the station. During processing of packages at the station by an agent from the collection area to a downstream process, the adjustable package flow stop wall may be moved to the intermediate or active position to facilitate easier and more ergonomic grasping and transfer of packages, e.g., lighter or smaller packages such as envelopes or individual items, by the agent. Further, during processing of packages, the adjustable package flow stop wall may also be moved to the retracted or flush position to facilitate still easier and more ergonomic grasping and transfer of packages, e.g., heavier or larger packages such as boxes or containers, by the agent.

In example embodiments, the adjustable package flow stop wall described herein may include a frame assembly, a wall assembly, a pedal assembly, and/or a handle assembly. The frame assembly may be pivotally coupled to an underside of the station. The wall assembly may be rigidly coupled to the frame assembly and move with the frame assembly. The pedal and handle assemblies may be operatively coupled to the frame assembly and/or the wall assembly, in order to move the wall assembly between a plurality of positions relative to an upper surface of the station.

In further example embodiments, various counterweights, bias elements, springs, dampers, or similar elements may be associated with portions of the adjustable package flow stop wall described herein. For example, one or more counterweights or bias elements may be associated with the frame assembly to bias the wall assembly toward an extended or closeout position. In addition, one or more counterweights or bias elements may be associated with the handle assembly to hold or maintain the handle in one or more positions that may correspond with one or more of the plurality of positions of the wall assembly.

In other example embodiments, the adjustable package flow stop wall described herein may include one or more sensors, actuators, buttons, input elements, or other electromechanical elements to control positions and/or movements of the adjustable package flow stop wall at least partially or fully automatically. For example, one or more of the plurality of positions of the wall assembly may be defined based at least in part on data from one or more sensors, e.g., identifications of agents and/or packages. In addition, the wall assembly may be moved between the plurality of positions using one or more actuators, which may also be based at least in part on data from one or more sensors, e.g., identifications of agents and/or packages. Further, the pedal and/or handle assemblies may comprise buttons or input elements configured to activate the one or more actuators.

Using the adjustable package flow stop wall systems and associated methods described herein, packages that are to be processed at a station may be both accumulated safely and securely at a collection area, and transferred more easily and ergonomically to a downstream process by an agent. In addition, because the adjustable package flow stop wall may be actuated in a substantially hands-free manner, e.g., using the pedal assembly and/or one or more actuators, the agent may be able to grasp, lift, slide, move, transfer, place, or sort packages with both hands substantially free to manipulate packages. As a result, the adjustable package flow stop wall described herein may improve safety and ergonomics associated with package processing by reducing or minimizing reaching and/or lifting by an agent to perform various operations.

FIG. 1A is a schematic, perspective view diagram 100A of an example package processing station including an adjustable package flow stop wall, in accordance with implementations of the present disclosure.

The example package processing station may include an inbound conveyance 102, a collection area 104, an adjustable package flow stop wall 105, a work surface 106, a visual and/or audio input/output device 108, an imaging or scanning device 110, a controller or control system 112, an outbound conveyance 114, and/or a problem solve conveyance 116.

The inbound conveyance 102 may comprise a chute, slide, cart, container, conveyor, robotic drive unit, autonomous mobile robot, or other conveyance mechanism or material handling equipment. Various packages, such as boxes, containers, envelopes, items, or other objects, may move along the inbound conveyance 102 from an upstream process or station toward the collection area 104. The collection area 104 may comprise an area, region, tray, container, bin, or other receptacle, and the collection area 104 may be connected to or integral with a portion of the inbound conveyance 102. Various packages may arrive and accumulate in the collection area 104 from the inbound conveyance 102.

The adjustable package flow stop wall 105 may, in one or more partially or fully extended positions of the wall, act as a portion of the collection area 104. For example, the adjustable package flow stop wall 105 may form one wall or side of the collection area 104 to facilitate accumulation of packages in the collection area 104. In addition, the adjustable package flow stop wall 105 may move to one or more partially or fully retracted positions to facilitate transfer of packages from the collection area 104 to the outbound conveyance 114 via the work surface 106, as further described herein.

Figure 1B:
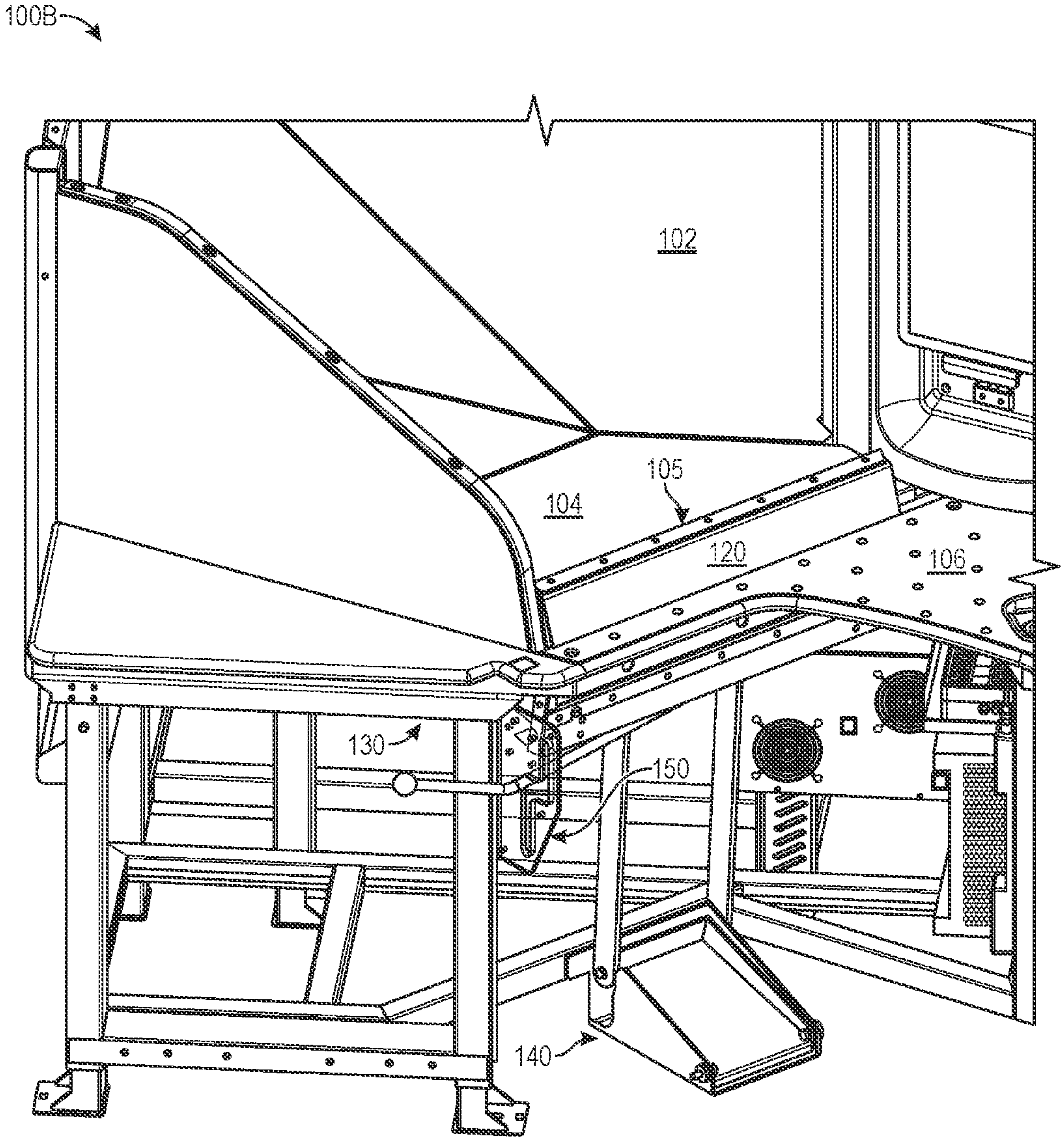
FIG. 1B is a schematic, perspective view diagram of a portion of an example package processing station including an adjustable package flow stop wall, in accordance with implementations of the present disclosure.

FIG. 1B is a schematic, perspective view diagram 100B of a portion of an example package processing station including an adjustable package flow stop wall, in accordance with implementations of the present disclosure. As shown in FIG. 1B, the adjustable package flow stop wall 105 may comprise one or more assemblies, including a wall assembly 120 that extends at least partially through and above an upper surface of the station, a frame assembly 130 that is coupled to an underside of the station, a pedal assembly 140 that is operatively coupled to the frame assembly 130 and/or wall assembly 120, and/or a handle assembly 150 that is operatively coupled to the frame assembly 130 and/or wall assembly 120. Various features of the one or more assemblies of the adjustable package flow stop wall 105 are described in more detail herein.

Referring again to FIG. 1A, the work surface 106 may comprise a table, work area, flat portion of a station, upper surface of the station, or other surface proximate an agent position of the station. In some example embodiments, the work surface 106 may include one or more rollers, wheels, balls, low friction materials, or other friction-reducing elements to facilitate transfer or sliding of packages onto and across the work surface 106. The outbound conveyance 114 may comprise a chute, slide, cart, container, conveyor, robotic drive unit, autonomous mobile robot, or other conveyance mechanism or material handling equipment. Various packages may be processed and transferred by an agent at the agent position onto and/or across the work surface 106 from the collection area 104 to the outbound conveyance 114, and subsequently to one or more downstream processes or stations.

The problem solve conveyance 116 may also comprise a chute, slide, cart, container, conveyor, robotic drive unit, autonomous mobile robot, or other conveyance mechanism or material handling equipment. Various packages that cannot be transferred to the outbound conveyance 114 may instead be transferred to the problem solve conveyance 116 for various reasons, e.g., an unidentified or unknown package, a damaged package, an open package, or various other reasons, and subsequently to one or more downstream processes or stations to resolve or correct any identified issues or problems associated with such packages.

The visual and/or audio input/output device 108 may comprise a display, monitor, touchscreen, keyboard, keypad, input elements, microphones, speakers, or other visual and/or audio input/output devices. Various instructions, messages, or notifications may be output to an agent associated with the station, and/or various data, inputs, or confirmations may be received from an agent associated with the station. In addition, the imaging or scanning device 110 may comprise a camera, imaging sensor, barcode or quick response (QR) code scanner, or other imaging or scanning device. The imaging or scanning device 110 may be positioned overhead with a field of view including at least a portion of the work surface 106 and/or the collection area 104. During processing of packages from the collection area 104 to the outbound conveyance 114 via the work surface 106, the imaging or scanning device 110 may detect and capture one or more identifiers associated with the packages, such as barcodes, QR codes, characters, text, numbers, symbols, or other identifiers, e.g., to identify one or more characteristics of the packages, such as an identity, source, contents, size, dimensions, weight, handling rules or exceptions, destination, or other characteristics.

The controller or control system 112 may be in communication with one or more of the inbound conveyance 102, the adjustable package flow stop wall 105, the visual and/or audio input/output device 108, the imaging or scanning device 110, the outbound conveyance 114, and/or the problem solve conveyance 116. The control system 112 may control, instruct, command, or coordinate various operations of the example package processing station. For example, the control system 112 may control or coordinate operations of the inbound conveyance 102 to accumulate packages at the collection area 104, may control or coordinate operations of the adjustable package flow stop wall 105 to facilitate processing and transfer of packages via the station, may control or coordinate operations of the visual and/or audio input/output device 108 and/or imaging or scanning device 110 to process and transfer packages via the station, and/or may control or coordinate operations of the outbound conveyance 114 and/or the problem solve conveyance 116 to transfer packages away from the station. Further details of the control system 112 are described herein at least with respect to FIG. 9.

Although FIGS. 1A and 1B illustrate a particular number, configuration, and arrangement of various components of an example package processing station, other example embodiments of the package processing station may include other numbers, configurations, or arrangements of the various components shown and described in FIGS. 1A and 1B.

Figure 2A:
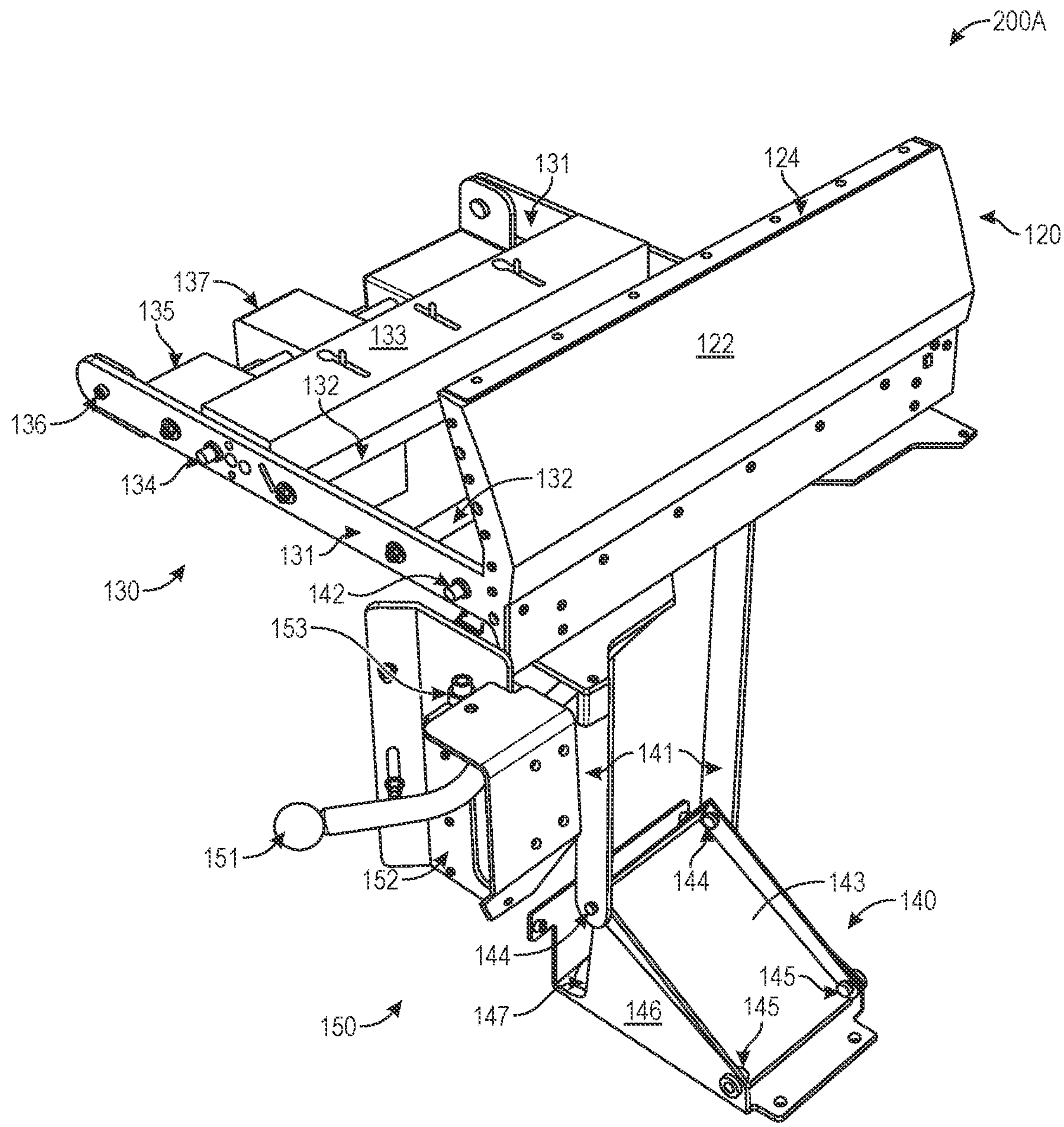
FIG. 2A is a schematic, front perspective view diagram of an example adjustable package flow stop wall, in accordance with implementations of the present disclosure.
Figure 2B:
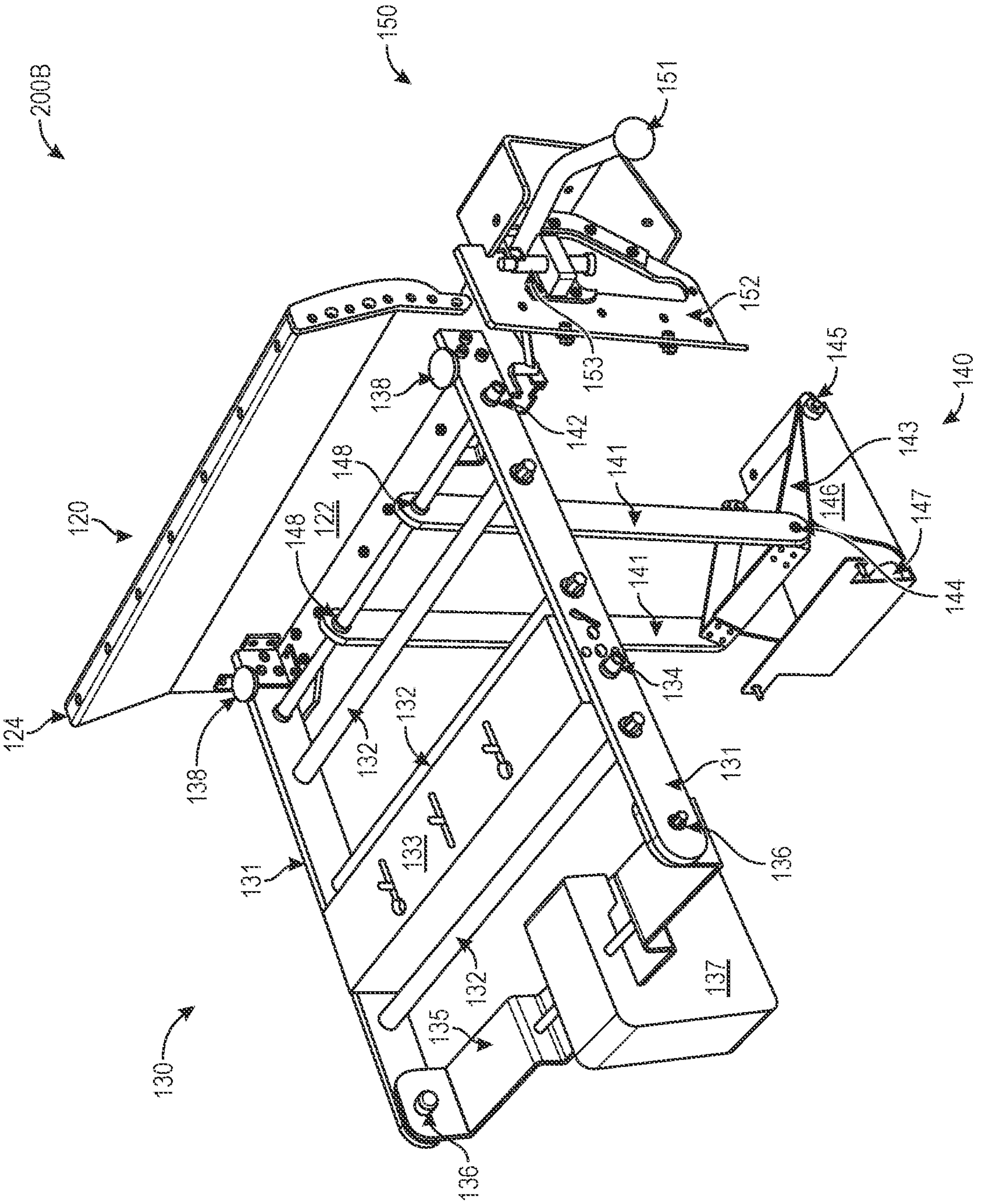
FIG. 2B is a schematic, rear perspective view diagram of an example adjustable package flow stop wall, in accordance with implementations of the present disclosure.

FIG. 2A is a schematic, front perspective view diagram 200A of an example adjustable package flow stop wall, in accordance with implementations of the present disclosure, and FIG. 2B is a schematic, rear perspective view diagram 200B of an example adjustable package flow stop wall, in accordance with implementations of the present disclosure.

The adjustable package flow stop wall described herein may comprise one or more assemblies, including a wall assembly 120, a frame assembly 130, a pedal assembly 140, and/or a handle assembly 150. For example, the wall assembly 120 may comprise a wall 122 and an upper surface 124 of the wall 122. In addition, the frame assembly 130 may comprise frame members 131 and struts 132, a frame bracket 133 and associated pivot joints 134, a counterweight bracket 135 and associated pivot joints 136, counterweights 137, and bumpers 138. Further, the pedal assembly 140 may comprise pedal linkages 141, pivot joints 142, 148, a pedal 143 and associated pivot joints 144, 145, a base 146, and bumpers 147. Moreover, the handle assembly 150 may comprise a handle 151, a guide plate 152, a damper 153, a handle bracket 154 and associated pivot joint 155, a pin 156 and groove 157, and a bias element 158, which are further shown and described at least with respect to FIGS. 3A and 3B.

In example embodiments, the wall assembly 120 may include various elements or components to facilitate or enable control of package accumulation and transfer from upstream to downstream processes. For example, the wall assembly 120 may include a wall 122 having a defined length, thickness, height, curvature, or other dimensions. In some example embodiments, the height of the wall 122 may be greater than approximately six inches, such that in the fully extended position, the wall 122 may extend approximately six inches above an upper surface of the station, e.g., a surface substantially parallel to the work surface 106 that connects the collection area 104 with the work surface 106. In addition, the length and thickness of the wall 122 may be sized so as to fit through a slot of the upper surface of the station through which the wall 122 extends, and gaps between the wall 122 and portions of the slot of the upper surface of the station may be approximately 0.5 inches or less to minimize potential pinch points. Further, a curvature of the wall 122 may be defined based on a movement of the wall assembly 120, and the frame assembly 130 to which it may be coupled, between two or more positions. For example, the frame assembly 130 may be pivotally coupled to an underside of the station, and the wall assembly 120 may be rigidly coupled to the frame assembly, such that the curvature of the wall 122 may be defined based on the pivoting movement of the wall assembly 120 and frame assembly 130 between two or more positions relative to the upper surface of the station.

The wall assembly 120 may also include an upper surface 124 having one or more friction-reducing elements. For example, the upper surface 124 may include one or more rollers, wheels, balls, low friction materials, or other friction-reducing elements. By reducing or lowering friction associated with the upper surface 124, various packages may be more easily and ergonomically processed, rolled, slid, pushed, pulled, moved, or transferred over or along the upper surface 124 of the wall assembly 120 from the collection area 104 to the work surface 106.

The wall 122, upper surface 124, and various other elements or portions of the wall assembly 120 may be formed of various materials, such as metals, plastics, composites, rubber, silicone, other materials, or combinations thereof. In addition, the wall assembly 120 may be fabricated or assembled using various types of fasteners, rivets, couplings, attachments, adhesives, welds, or other types of joining elements or processes.

Although FIGS. 2A and 2B illustrate a particular number, configuration, and arrangement of various components of a wall assembly 120, other example embodiments of the adjustable package flow stop wall may include other numbers, configurations, or arrangements of the various components of the wall assembly 120. For example, the wall 122 may have various other lengths, thicknesses, heights, or other dimensions, as well as different curvatures or no curvature. In addition, the upper surface 124 may have various other shapes, sizes, protrusions, bumps, grooves, or other elements to reduce friction.

In example embodiments, the frame assembly 130 may include various elements or components to couple to a portion of a station, and to which the various other assemblies may be operatively coupled. For example, the frame assembly 130 may include one or more frame members 131 and one or more struts 132 that may form a structure of the frame assembly 130 to which various components may be coupled. The frame members 131 may comprise beams, poles, rods, or other elements that extend substantially parallel to each other and along opposite sides of the frame assembly 130. In addition, the struts 132 may comprise beams, poles, rods, or other elements that extend substantially parallel to each other and perpendicular to and between the frame members 131, and the struts 132 may couple to the frame members 131. The struts 132 may provide structural rigidity to the frame assembly 130. Further, the wall assembly 120 may be coupled to a portion of the frame members 131 and/or struts 132 of the frame assembly 130. In example embodiments, the wall assembly 120 may be rigidly coupled to the frame members 131 and/or struts 132 of the frame assembly 130 and move together with the frame assembly 130.

The frame assembly 130 may also include a frame bracket 133 and associated pivot joints 134 to operatively couple the frame assembly 130 to a station. For example, the frame bracket 133 may extend between and couple to the frame members 131 via pivot joints 134. In addition, the frame bracket 133 may enable coupling of the frame assembly 130 to a station, e.g., to an underside of a station. In this manner, the frame bracket 133 may be coupled to a station, and the remainder of the frame assembly 130 may be pivotally movable via pivot joints 134 relative to the frame bracket 133 and station, such that the wall assembly 120 may move between two or more positions relative to the upper surface of the station.

The frame assembly 130 may also include a counterweight bracket 135 and associated pivot joints 136 to bias the frame assembly 130 to a particular position. For example, the counterweight bracket 135 may extend between and couple to the frame members 131 via pivot joints 136. Alternatively, the counterweight bracket 135 may be rigidly or fixedly coupled to the frame members 131. In addition, the counterweight bracket 135 may enable attachment, detachment, addition, or removal of one or more counterweights 137 to or from the frame assembly 130. The counterweights 137 may comprise various plates, weights, masses, discs, rings, or other weights that may be added to or removed from the counterweight bracket 135. In this manner, the counterweight bracket 135 and counterweights 137 may bias the frame assembly 130 and wall assembly 120 to a particular position, e.g., a fully extended position, among the two or more positions of the wall assembly 120 relative to the upper surface of the station.

The frame assembly 130 may also include one or more bumpers 138 to reduce or minimize impact and/or noise during movement of the frame assembly 130. For example, the bumpers 138 may be coupled to one or more of the frame members 131 and/or struts 132, and the bumpers 138 may soften or dampen impact or contact between the frame assembly 130 and portions of a station, e.g., portions of an underside of a station. Alternatively or in addition, the bumpers 138 may be coupled to portions of the station to soften or dampen impact or contact with portions of the frame assembly 130. In some example embodiments, the bumpers 138 may be positioned to dampen contact between the frame assembly 130 and portions of a station when the frame assembly 130 and wall assembly 120 are moved to or positioned in a particular position, e.g., a fully extended position, among the two or more positions of the wall assembly 120 relative to the upper surface of the station.

The frame members 131 and struts 132, frame bracket 133 and associated pivot joints 134, counterweight bracket 135 and associated pivot joints 136, counterweights 137, bumpers 138, and various other elements or portions of the frame assembly 130 may be formed of various materials, such as metals, plastics, composites, rubber, silicone, other materials, or combinations thereof. In addition, the frame assembly 130 may be fabricated or assembled using various types of fasteners, rivets, couplings, attachments, adhesives, welds, or other types of joining elements or processes. Further, the frame assembly 130 may also be coupled with portions of a station, the wall assembly 120, the pedal assembly 140, and/or the handle assembly 150 using various types of fasteners, rivets, couplings, attachments, adhesives, welds, or other types of joining elements or processes.

Although FIGS. 2A and 2B illustrate a particular number, configuration, and arrangement of various components of a frame assembly 130, other example embodiments of the adjustable package flow stop wall may include other numbers, configurations, or arrangements of the various components of the frame assembly 130. For example, the frame members 131, struts 132, frame bracket 133, counterweight bracket 135, counterweights 137, and bumpers 138 may have various other numbers, dimensions, configurations, or arrangements. In addition, the counterweight bracket 135, associated pivot joints 136, counterweights 137, and/or bumpers 138 may be combined with or replaced by other types of bias elements, such as springs, gas or pneumatic springs, dampers, or other similar elements.

In example embodiments, the pedal assembly 140 may include various elements or components to enable substantially hands-free operation of the adjustable package flow stop wall. For example, the pedal assembly 140 may include pedal linkages 141 and associated pivot joints 142, 148 to couple to and control movement of the frame assembly 130 and wall assembly 120. The pedal linkages 141 may comprise beams, poles, rods, or other elements that extend substantially parallel to each other and couple to a portion of the frame assembly 130, e.g., a strut of the frame assembly, via pivot joints 142, 148. The pedal linkages 141 may be pivotally coupled to the strut via pivot joints 148, and/or the strut may be pivotally coupled to the frame members 131 via pivot joints 142. The pedal linkages 141 may transfer motion of the pedal assembly 140 to the frame assembly 130 and wall assembly 120, such that the wall assembly 120 may move between two or more positions relative to the upper surface of the station.

The pedal assembly 140 may also include a pedal 143, associated pivot joints 144, 145, and a base 146 to receive and transfer motion of the pedal assembly 140 to the frame assembly 130 and wall assembly 120 in a substantially hands-free manner. For example, the pedal 143 may comprise a plate, sheet, surface, or other component that may be moved or actuated by a foot of an agent at a station. The pedal 143 may be pivotally coupled to the pedal linkages 141 via pivot joints 144, and the pedal 143 may also be pivotally coupled to a base 146 via pivot joints 145. The base 146 may also comprise a plate, sheet, surface, or other component that may couple to and receive the pedal 143 and/or a foot of an agent at a station. In some example embodiments, the base 146 may be attached or coupled to a floor, platform, or base associated with a station. In this manner, movement or actuation of the pedal 143 may transfer motion via the pedal linkages 141 to the frame assembly 130 and wall assembly 120, such that the wall assembly 120 may move between two or more positions relative to the upper surface of the station.

In some example embodiments, the pivotal couplings of the pedal 143 as shown in FIGS. 2A and 2B may generally reduce or minimize potential pinch points for a foot or toes of an agent at a station. However, in alternative example embodiments, the pivotal coupling between the pedal 143 and the pedal linkages 141, and the pivotal coupling between the pedal 143 and the base 146 may be switched or swapped. In this alternative, the pedal 143 may be pivotally coupled to the pedal linkages 141 via pivot joints 145, and the pedal 143 may be pivotally coupled to the base 146 via pivot joints 144. Then, instead of the pedal 143 substantially rotating about pivot joints 145 relative to the base 146, the pedal 143 may substantially rotate about pivot joints 144 relative to the base 146.

The pedal assembly 140 may also include one or more bumpers 147 to reduce or minimize impact and/or noise during movement of the pedal assembly 140. For example, the bumpers 147 may be coupled to the base 146, and the bumpers 147 may soften or dampen impact or contact between the pedal 143 and the base 146. Alternatively or in addition, the bumpers 147 may be coupled to portions of the pedal 143 to soften or dampen impact or contact with the base 146. In some example embodiments, the bumpers 147 may be positioned to dampen contact between the pedal 143 and the base 146 when the frame assembly 130 and wall assembly 120 are moved to or positioned in a particular position, e.g., a fully retracted position, among the two or more positions of the wall assembly 120 relative to the upper surface of the station.

In additional example embodiments, the pedal assembly 140 may also include a ratcheting or locking mechanism to maintain the pedal in one or more positions that may correspond to one or more positions of the wall assembly 120 relative to the upper surface of the station. For example, a first movement of the pedal may cause ratcheting or locking in a first position, a second additional movement of the pedal may cause ratcheting or locking in a second position, and so on, and a final movement of the pedal to an end of travel may cause release or reset of the ratcheting or locking mechanism. In this manner, the substantially hands-free operation of the adjustable package flow stop wall using the pedal assembly 140 described herein may be further facilitated by maintaining one or more positions of the pedal assembly 140 that correspond to one or more positions of the wall assembly 120 relative to the upper surface of the station.

The pedal linkages 141, pivot joints 142, 148, pedal 143 and associated pivot joints 144, 145, base 146, bumpers 147, and various other elements or portions of the pedal assembly 140 may be formed of various materials, such as metals, plastics, composites, rubber, silicone, other materials, or combinations thereof. In addition, the pedal assembly 140 may be fabricated or assembled using various types of fasteners, rivets, couplings, attachments, adhesives, welds, or other types of joining elements or processes. Further, the pedal assembly 140 may also be coupled with a base of a station, the wall assembly 120, and/or the frame assembly 130 using various types of fasteners, rivets, couplings, attachments, adhesives, welds, or other types of joining elements or processes.

Although FIGS. 2A and 2B illustrate a particular number, configuration, and arrangement of various components of a pedal assembly 140, other example embodiments of the adjustable package flow stop wall may include other numbers, configurations, or arrangements of the various components of the pedal assembly 140. For example, the pedal linkages 141, pedal 143, base 146, and bumpers 147 may have various other numbers, dimensions, configurations, or arrangements. In other example embodiments, a pedal assembly 140 may not be included in an example adjustable package flow stop wall, and the adjustable package flow stop wall may instead be actuated using a handle assembly 150 and/or one or more sensors, actuators, and/or input elements.

Figure 3A:
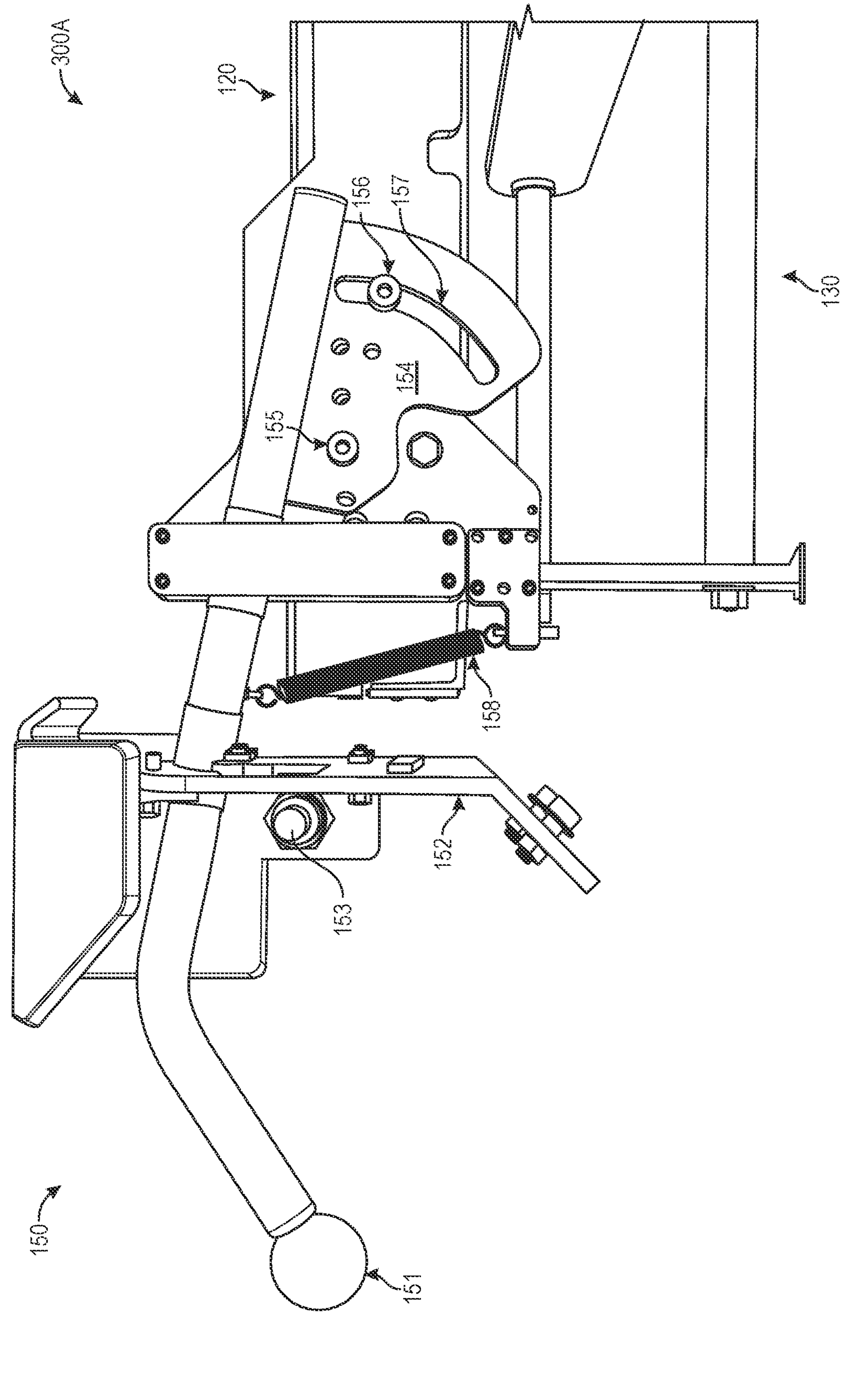
FIG. 3A is a schematic, bottom view diagram of an example handle assembly of an adjustable package flow stop wall, in accordance with implementations of the present disclosure.
Figure 3B:
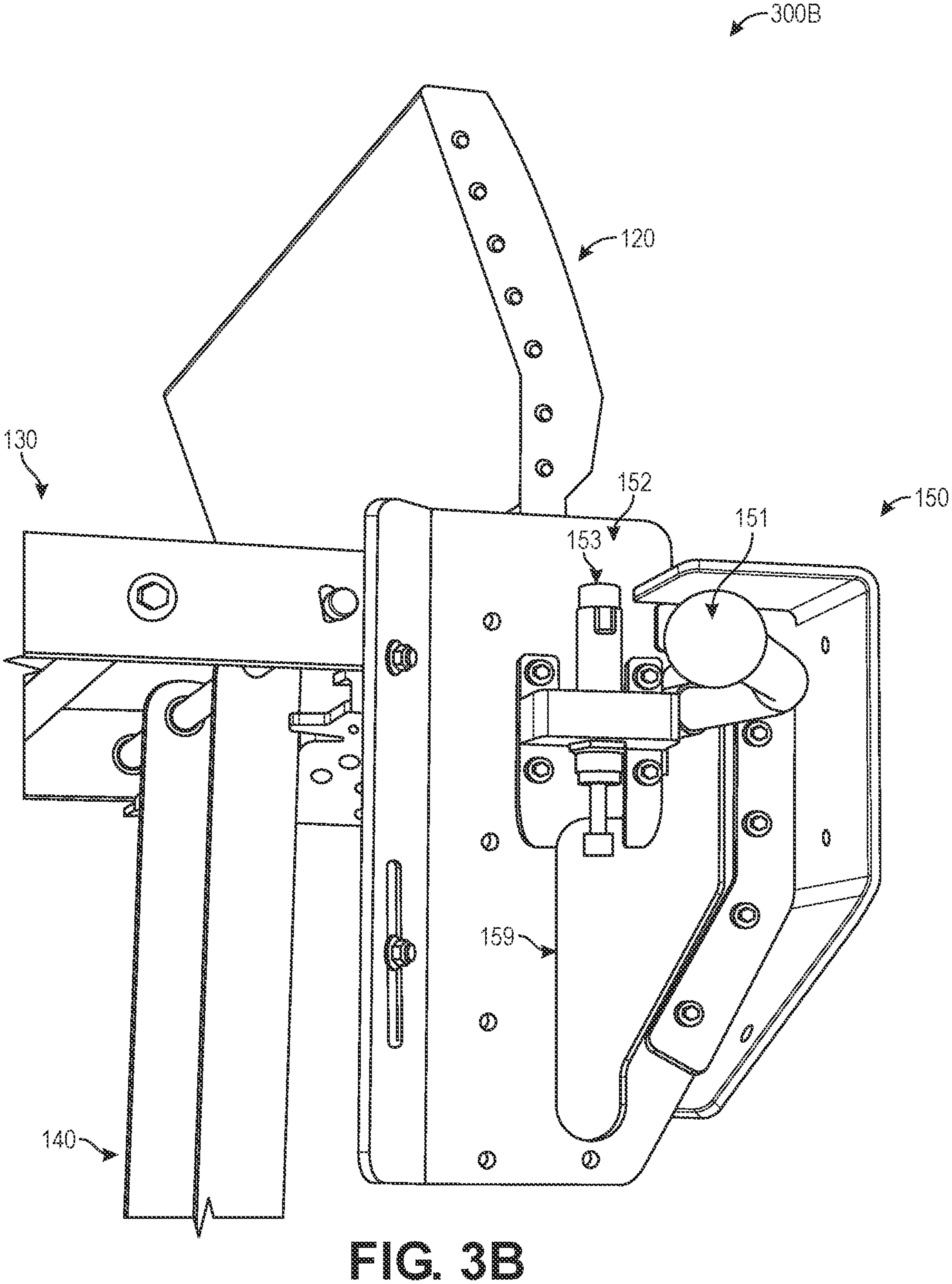
FIG. 3B is a schematic, side perspective view diagram of an example handle assembly of an adjustable package flow stop wall, in accordance with implementations of the present disclosure.

In addition to FIGS. 2A and 2B, additional details of the handle assembly 150 are shown at least with respect to FIGS. 3A and 3B. In this respect, FIG. 3A is a schematic, bottom view diagram 300A of an example handle assembly of an adjustable package flow stop wall, in accordance with implementations of the present disclosure, and FIG. 3B is a schematic, side perspective view diagram 300B of an example handle assembly of an adjustable package flow stop wall, in accordance with implementations of the present disclosure.

In example embodiments, the handle assembly 150 may include various elements or components to facilitate operation of the adjustable package flow stop wall, potentially in coordination with operation of the pedal assembly 140. For example, as shown in FIG. 3B, the handle assembly 150 may include a handle 151 and a guide plate 152 to couple to and control movement of the frame assembly 130 and wall assembly 120. The handle 151 may comprise a beam, rod, pole, or other element that is movably coupled to a portion of the frame assembly 120 and/or the wall assembly 120. In addition, a portion of the handle 151 may move within a guide plate 152, e.g., within a guide track 159 of a guide plate 152. The guide plate 152 may comprise a plate, sheet, bracket, or other portion of material that may be coupled to a portion of the station, such that the guide plate 152 may be fixed relative to the station, e.g., to a side or front of the station. Further, the guide track 159 may be formed within the guide plate 152, may include low friction materials or coatings to facilitate sliding movement of the handle 151, and may define one or more positions of the handle 151 that may correspond to one or more positions of the wall assembly 120 relative to the upper surface of the station. For example, respective portions of the guide track 159 may define a fully extended position, an intermediate position, and a fully retracted position of the handle 151 and wall assembly 120 relative to the upper surface of the station, as is further described herein at least with respect to FIGS. 6A-6C.

As shown in FIG. 3B, the handle assembly 150 may also include a damper 153 to reduce or minimize impact and/or noise during movement of the handle assembly 150. For example, the damper 153 may comprise a spring, a damper, or a mechanical or hydraulic shock absorber or damper that is coupled to the guide plate 152, and the damper 153 may soften or dampen impact or contact between a portion of the handle 151 and a portion of the guide track 159 within the guide plate 152. Alternatively or in addition, the damper 153 may be coupled to a portion of the handle 151 to soften or dampen impact or contact with one or more portions of the guide track 159 within the guide plate 152. In some example embodiments, the damper 153 may be positioned to dampen contact between the handle 151 and the guide track 159 when the handle assembly 150, frame assembly 130, and wall assembly 120 are moved to or positioned in a particular position, e.g., an intermediate position, among the two or more positions of the wall assembly 120 relative to the upper surface of the station.

As shown in FIG. 3A, the handle assembly 150 may also include a handle bracket 154 and associated pivot joint 155, and a pin 156 and groove 157. For example, the handle bracket 154 may comprise a plate, sheet, or portion of material that is coupled to a portion of the handle 151. The handle bracket 154 may be pivotally coupled to a portion of the frame assembly 130 and/or wall assembly 120 via pivot joint 155, as well as pin 156 and groove 157. The handle 151 and handle bracket 154 may pivot or rotate substantially around the pivot joint 155. In addition, the pin 156 may be attached or formed as part of the frame assembly 130 or wall assembly 120 and may be slidably held or trapped within the groove 157 formed within the handle bracket 154. In this manner, during pivoting or rotation of the handle 151 and handle bracket 154 around the pivot joint 155, the groove 157 may also move or slide relative to the pin 156. Further, the pivot joint 155, as well as the pin 156 and groove 157, may prevent relative movement between the handle 151 and the frame assembly 130 or wall assembly 120 in a direction substantially perpendicular to an axis of rotation of the handle 151 and handle bracket 154 around pivot joint 155. As a result, the handle 151 may move substantially together with the frame assembly 130 and wall assembly 120 among the two or more positions of the wall assembly 120 relative to the upper surface of the station.

The handle assembly 150 may also include a bias element 158 to maintain the handle 151 in one or more positions within the guide track 159 of the guide plate 152. For example, the bias element 158 may comprise a spring, gas or pneumatic spring, damper, or other similar element. In the example shown in FIGS. 3A and 3B, the bias element 158 may comprise a tension spring that may bias the handle 151 to one or more positions within the guide track 159. For example, in contrast to the fully extended position of the handle 151, e.g., an upper, right side portion of the guide track 159 shown in FIG. 3B, when the handle 151 is moved to either the intermediate position or fully retracted position, e.g., a middle or lower, left side portion of the guide track 159 shown in FIG. 3B, the bias element 158 may urge, bias, or maintain the handle 151 in either the intermediate position or fully retracted position, e.g., toward a left side portion of the guide track 159 shown in FIG. 3B. Then, in order to move the handle 151 back to the fully extended position shown in FIG. 3B, the handle 151 may be moved or pulled against a bias force of the bias element 158 to return to the fully extended position, e.g., moved or pulled toward an upper, right side of the guide track 159 shown in FIG. 3B.

Figure 6A:
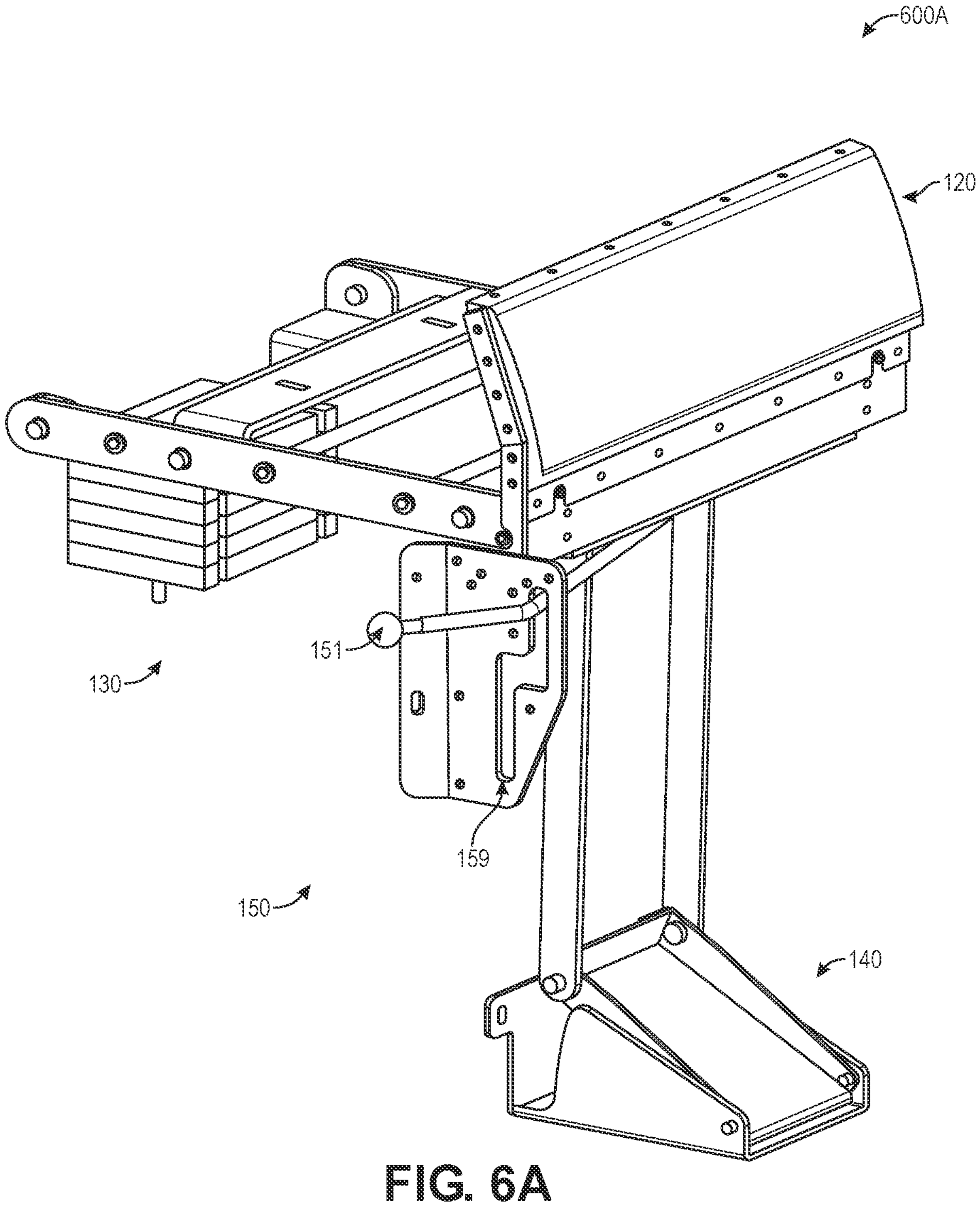
FIG. 6A is a schematic, front perspective view diagram of an example adjustable package flow stop wall in a first position, in accordance with implementations of the present disclosure.
Figure 6B:
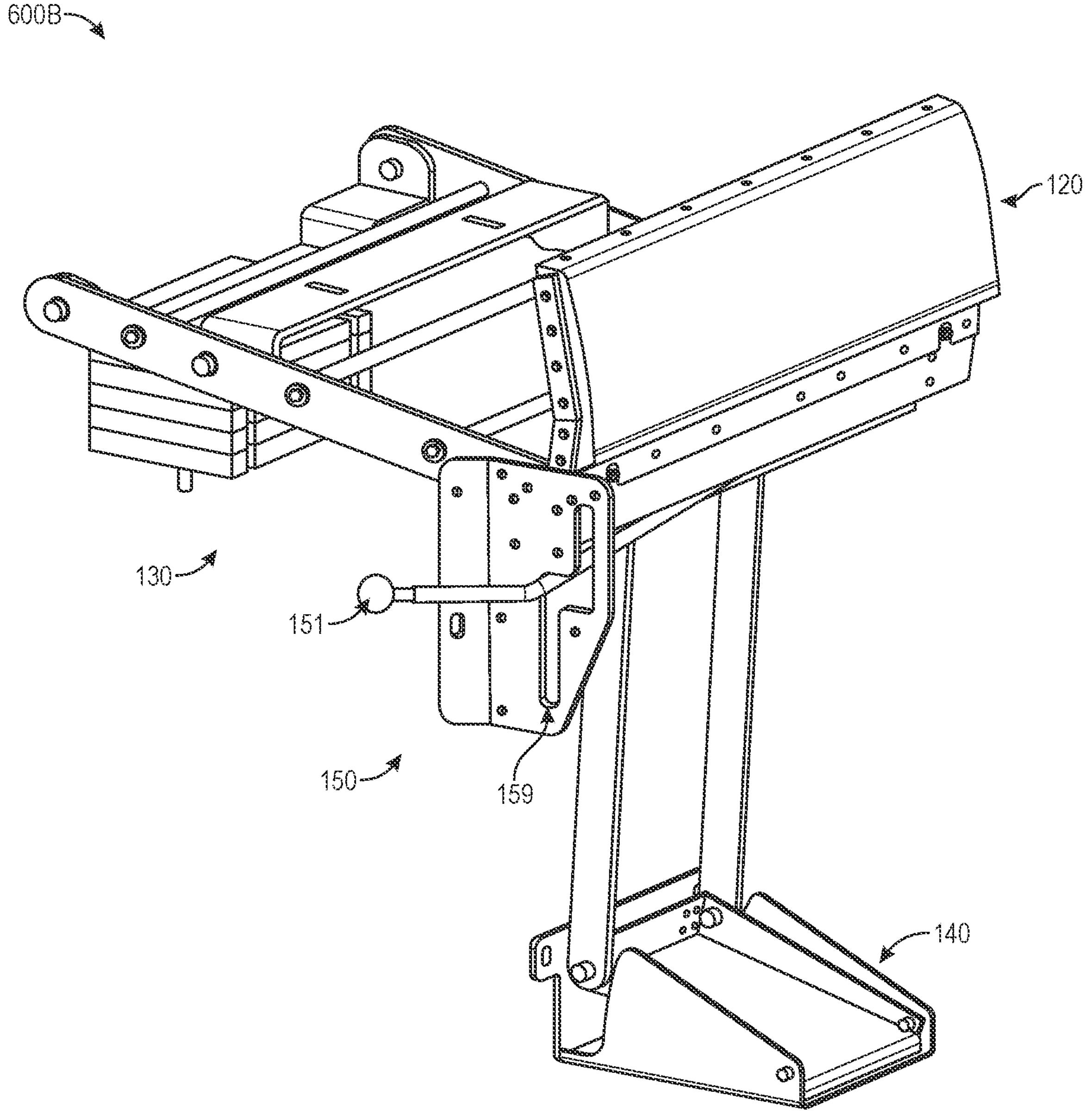
FIG. 6B is a schematic, front perspective view diagram of an example adjustable package flow stop wall in a second position, in accordance with implementations of the present disclosure.
Figure 6C:
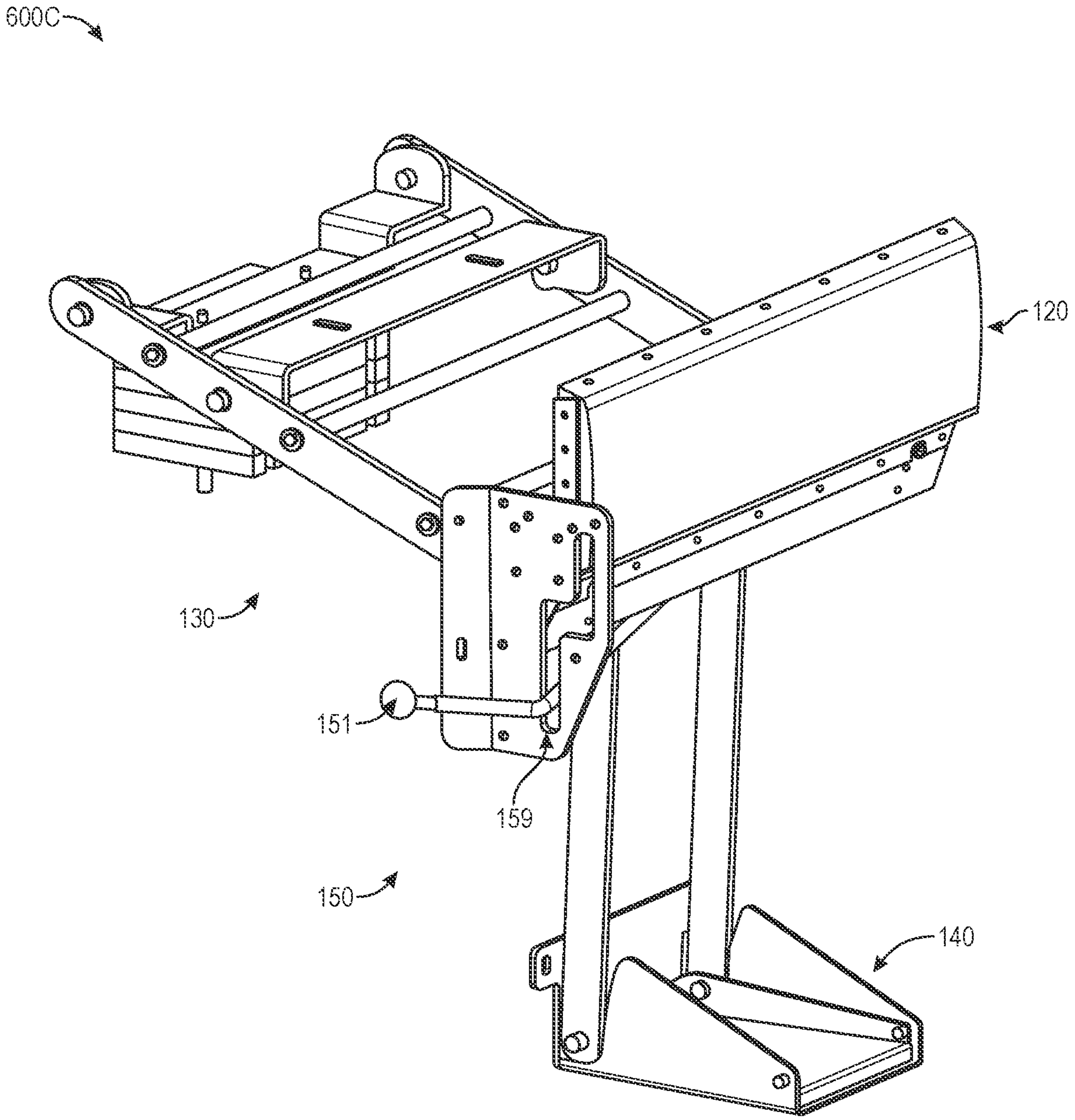
FIG. 6C is a schematic, front perspective view diagram of an example adjustable package flow stop wall in a third position, in accordance with implementations of the present disclosure.

Further details of the movements of the wall assembly 120, frame assembly 130, pedal assembly 140, and handle assembly 150 between and among the two or more positions, e.g., including a fully extended position, an intermediate position, and a fully retracted position, of the wall assembly 120 relative to the upper surface of the station are described herein at least with respect to FIGS. 6A-6C.

The handle 151, guide plate 152, damper 153, handle bracket 154 and associated pivot joint 155, pin 156 and groove 157, bias element 158, and various other elements or portions of the handle assembly 150 may be formed of various materials, such as metals, plastics, composites, rubber, silicone, other materials, or combinations thereof. In addition, the handle assembly 150 may be fabricated or assembled using various types of fasteners, rivets, couplings, attachments, adhesives, welds, or other types of joining elements or processes. Further, the handle assembly 150 may also be coupled with portions of a station, the wall assembly 120, the frame assembly 130, and/or the pedal assembly 140 using various types of fasteners, rivets, couplings, attachments, adhesives, welds, or other types of joining elements or processes.

Although FIGS. 2A-3B illustrate a particular number, configuration, and arrangement of various components of a handle assembly 150, other example embodiments of the adjustable package flow stop wall may include other numbers, configurations, or arrangements of the various components of the handle assembly 150. For example, the handle 151, guide plate 152, damper 153, handle bracket 154, pin 156 and groove 157, and bias element 158 may have various other numbers, dimensions, configurations, or arrangements. In addition, the guide plate 152 and guide track 159 may be formed with various numbers of defined positions, e.g., more or less than the positions generally described herein, that may correspond to various numbers of defined positions of the wall assembly 120 relative to the upper surface of the station. In other example embodiments, a handle assembly 150 may not be included in an example adjustable package flow stop wall, and the adjustable package flow stop wall may instead be actuated using a pedal assembly 140 and/or one or more sensors, actuators, and/or input elements.

Figure 4:
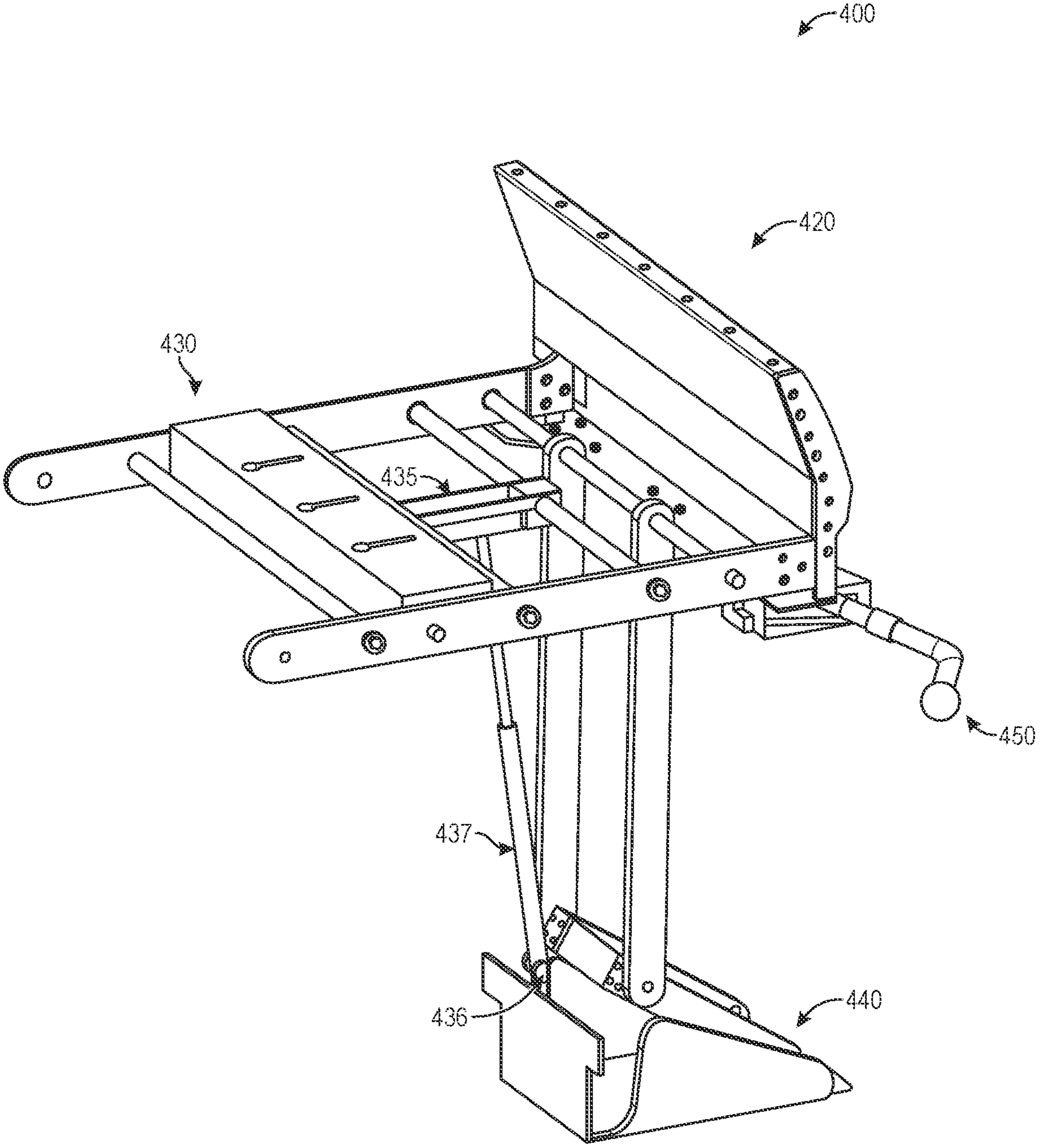
FIG. 4 is a schematic, rear perspective view diagram of another example adjustable package flow stop wall, in accordance with implementations of the present disclosure.

FIG. 4 is a schematic, rear perspective view diagram 400 of another example adjustable package flow stop wall, in accordance with implementations of the present disclosure.

The example adjustable package flow stop wall shown in FIG. 4 may comprise one or more assemblies, including a wall assembly 420, a frame assembly 430, a pedal assembly 440, and/or a handle assembly 450. Each of the assemblies 420, 430, 440, 450 may include any or all of the features, elements, or components described herein with respect to the various respective assemblies 120, 130, 140, 150 in the context of FIGS. 1A-3B, although not specifically shown in FIG. 4.

In contrast to the frame assembly 130 described with respect to FIGS. 2A and 2B, the frame assembly 430 as shown in FIG. 4 may not include a counterweight bracket, associated pivot joints, or counterweights to bias the frame assembly 430, and the wall assembly 420 coupled thereto, to a particular position, e.g., a fully extended position of the wall assembly 420 relative to an upper surface of a station.

Instead, the frame assembly 430 may include a bias element 437 that is coupled between a portion of the frame assembly 430 and a portion of the pedal assembly 440, via respective pivot joints 435, 436. For example, one end of the bias element 437 may be pivotally coupled to a portion of the frame assembly 430, such as a frame member, strut, or other similar element or component, and an opposite end of the bias element 437 may be pivotally coupled to a portion of the pedal assembly 440, such as a portion of a base of the pedal or other similar element or component. The bias element 437 may comprise a gas or pneumatic spring, a spring, a damper, or other bias element. Further, the bias element 437 may bias the frame assembly 430, and the wall assembly 420 coupled thereto, to a particular position, e.g., a fully extended position of the wall assembly 420 relative to an upper surface of a station.

Although FIG. 4 illustrates a particular number, configuration, and arrangement of various components of a frame assembly 430, other example embodiments of the adjustable package flow stop wall may include other numbers, configurations, or arrangements of the various components of the frame assembly 430. For example, the bias element 437 may have various other numbers, dimensions, configurations, or arrangements. In addition, the bias element 437 may be operatively coupled between various other portions of a station, such as a base or platform of the station, portions of the wall assembly 420, portions of the frame assembly 430, and/or portions of the pedal assembly 440.

Figure 5:
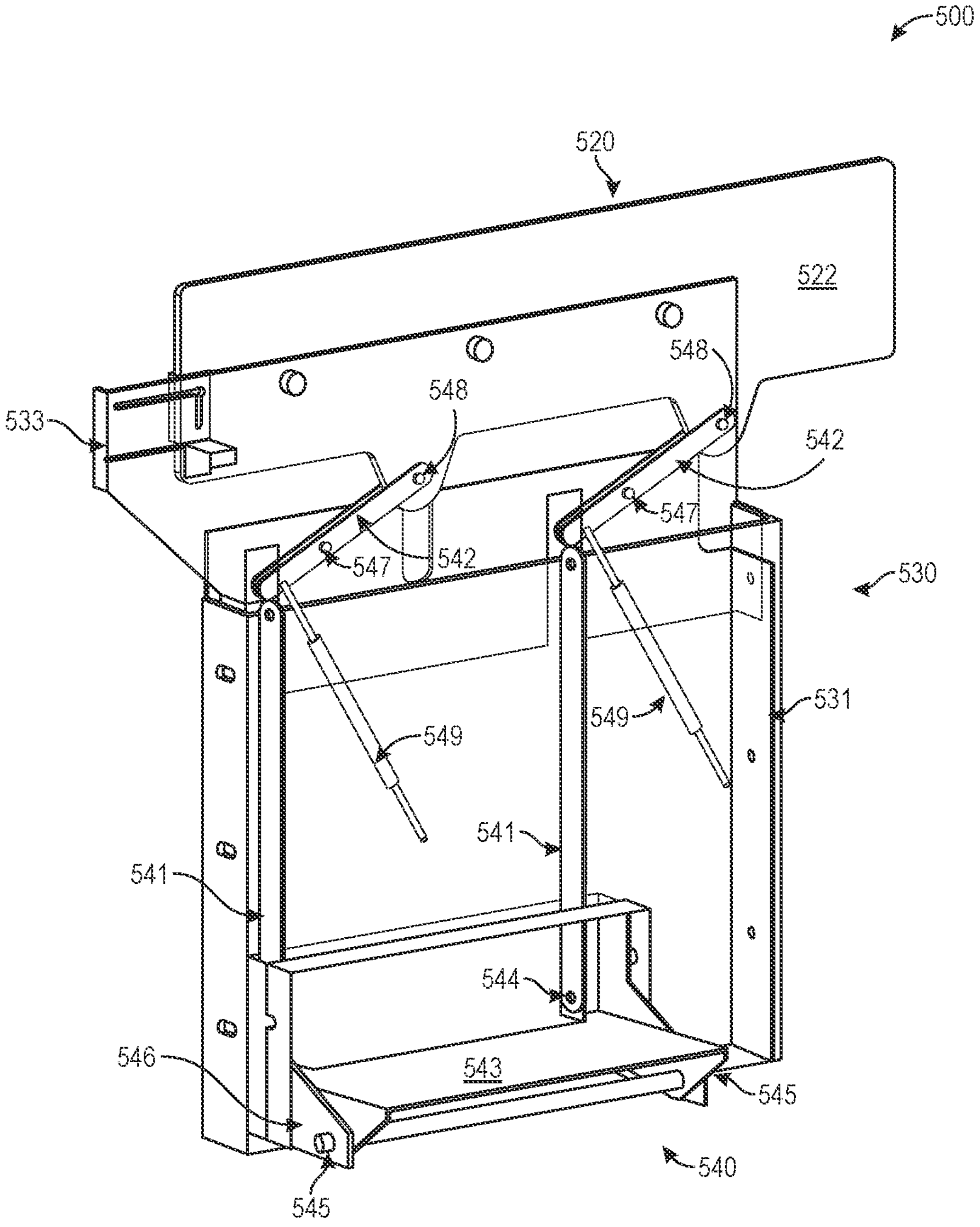
FIG. 5 is a schematic, front perspective view diagram of yet another example adjustable package flow stop wall, in accordance with implementations of the present disclosure.

FIG. 5 is a schematic, front perspective view diagram 500 of yet another example adjustable package flow stop wall, in accordance with implementations of the present disclosure.

The example adjustable package flow stop wall shown in FIG. 5 may comprise one or more assemblies, including a wall assembly 520, a frame assembly 530, and a pedal assembly 540. Each of the assemblies 520, 530, 540 may include any or all of the features, elements, or components described herein with respect to the various respective assemblies 120, 130, 140, 150 in the context of FIGS. 1A-3B, although not specifically shown in FIG. 5.

In contrast to the wall assembly 120 described with respect to FIGS. 2A and 2B, the wall assembly 520 as shown in FIG. 5 may include a wall 522 that is a substantially flat plate, wall, surface, or other material. In addition, the wall 522 may have a relatively small thickness, such that an upper surface of the wall 522 is relatively thin and corresponds to substantially only the thickness of the flat plate, wall, or surface.

In contrast to the frame assembly 130 described with respect to FIGS. 2A and 2B, the frame assembly 530 as shown in FIG. 5 may include frame members 531 comprising substantially a rectangular prism, box, or other at least partially enclosed, three-dimensional shape. The frame members 531 may comprise substantially poles, rods, flat beams, plates, walls, surfaces, or other materials to form the three-dimensional shape of the frame. In addition, an upper portion of the frame members 531 may couple to or be integrally formed with a frame bracket 533, which may also comprise a substantially flat plate, wall, surface, or other material. The frame bracket 533 may couple to a portion of a station, e.g., an underside of the station, such that the wall assembly 520 may move or extend between two or more positions relative to an upper surface of the station. Furthermore, the frame assembly 530 may substantially house, or at least partially enclose, the pedal assembly 540 to actuate the wall assembly 520 between the two more positions relative to an upper surface of the station.

In contrast to the pedal assembly 140 described with respect to FIGS. 2A and 2B, the pedal assembly 540 as shown in FIG. 5 may include pedal linkages 541, linkage arms 542 and associated pivot joints 547, 548 to couple to and control movement of the wall assembly 520. For example, the pedal linkages 541 may comprise beams, poles, rods, or other elements that extend substantially parallel to each other and travel or move substantially vertically relative to a portion of the frame assembly 530 responsive to actuation of a pedal 543. In addition, the pedal linkages 541 may couple to, push, and/or pull ends of the linkage arms 542. The linkage arms 542 may also comprise beams, poles, rods, or other elements that rotate substantially around pivot joints 547 that couple to a portion of the frame assembly 530. Opposite ends of the linkage arms 542 may be coupled to portions of the wall 522 of wall assembly 520 via pivot joints 548. Responsive to motion of the pedal linkages 541, the linkage arms 542 may rotate about pivot joints 547 and thereby cause movement of the wall 522 of wall assembly 520 via pivot joints 548. As a result, the pedal linkages 541 may transfer motion of a pedal 543 of the pedal assembly 540 to the wall assembly 520, such that the wall assembly 520 may move between two or more positions relative to the upper surface of the station.

The pedal assembly 540 may also include a pedal 543, associated pivot joints 544, 545, and a base 546 to receive and transfer motion of the pedal assembly 540 to the wall assembly 520 in a substantially hands-free manner. For example, the pedal 543 may comprise a plate, sheet, surface, or other component that may be moved or actuated by a foot of an agent at a station. The pedal 543 may be pivotally coupled to the pedal linkages 541 via pivot joints 544, and the pedal 543 may also be pivotally coupled to a base 546 via pivot joints 545. The base 546 may also comprise a plate, sheet, surface, or other component that may couple to and receive the pedal 543 and/or a foot of an agent at a station. In some example embodiments, the base 546 may be attached or coupled to a floor, platform, or base associated with a station. In this manner, movement or actuation of the pedal 543 may transfer motion via the pedal linkages 541 and linkage arms 542 to the wall assembly 520, such that the wall assembly 520 may move between two or more positions relative to the upper surface of the station.

In addition, the pedal assembly 540 may also include one or more bias elements 549 that may be coupled between a portion of the frame assembly 530 and a portion of the pedal assembly 540, e.g., portions of the linkage arms 542. For example, one end of the bias elements 549 may be pivotally coupled to a portion of the frame assembly 530, such as a frame members 531 or other similar elements or components, and an opposite end of the bias elements 549 may be pivotally coupled to portions of the pedal assembly 540, such as portions of the linkage arms 542 or other similar elements or components. The bias elements 549 may comprise gas or pneumatic springs, springs, dampers, or other bias elements. Further, the bias elements 549 may bias the wall assembly 520 to a particular position, e.g., a fully extended position of the wall assembly 520 relative to an upper surface of a station. In addition, due to the coupling, contact, or interference between the linkage arms 542 and pedal linkages 541, the bias elements 549 may also bias the pedal 543 of the pedal assembly 540 to a particular position, e.g., an undepressed position that corresponds to the fully extended position of the wall assembly 520 relative to an upper surface of a station.

In additional example embodiments, the pedal assembly 540 may also include a ratcheting or locking mechanism to maintain the pedal in one or more positions that may correspond to one or more positions of the wall assembly 520 relative to the upper surface of the station. For example, a first movement of the pedal may cause ratcheting or locking in a first position, a second additional movement of the pedal may cause ratcheting or locking in a second position, and so on, and a final movement of the pedal to an end of travel may cause release or reset of the ratcheting or locking mechanism. In this manner, the substantially hands-free operation of the adjustable package flow stop wall using the pedal assembly 540 described herein may be further facilitated by maintaining one or more positions of the pedal assembly 540 that correspond to one or more positions of the wall assembly 520 relative to the upper surface of the station.

The pedal linkages 541, linkage arms 542, pivot joints 547, 548, pedal 543 and associated pivot joints 544, 545, base 546, bias elements 549, and various other elements or portions of the pedal assembly 540 may be formed of various materials, such as metals, plastics, composites, rubber, silicone, other materials, or combinations thereof. In addition, the pedal assembly 540 may be fabricated or assembled using various types of fasteners, rivets, couplings, attachments, adhesives, welds, or other types of joining elements or processes. Further, the pedal assembly 540 may also be coupled with a base of a station, the wall assembly 520, and/or the frame assembly 530 using various types of fasteners, rivets, couplings, attachments, adhesives, welds, or other types of joining elements or processes.

Although FIG. 5 illustrates a particular number, configuration, and arrangement of various components of a wall assembly 520, frame assembly 530, and pedal assembly 540, other example embodiments of the adjustable package flow stop wall may include other numbers, configurations, or arrangements of the various components of the wall assembly 520, frame assembly 530, and pedal assembly 540. For example, the wall 522 may have various other lengths, thicknesses, heights, or other dimensions, as well as various curvatures. In addition, the frame members 531 and frame bracket 533 may have various other numbers, dimensions, configurations, or arrangements. Further, the pedal linkages 541, linkage arms 542, pedal 543, base 546, and bias elements 549 may have various other numbers, dimensions, configurations, or arrangements. Moreover, the bias elements 549 may be operatively coupled between various other portions of a station, portions of the wall assembly 520, portions of the frame assembly 530, and/or portions of the pedal assembly 540.

FIG. 6A is a schematic, front perspective view diagram 600A of an example adjustable package flow stop wall in a first position, in accordance with implementations of the present disclosure. FIG. 6B is a schematic, front perspective view diagram 600B of an example adjustable package flow stop wall in a second position, in accordance with implementations of the present disclosure. FIG. 6C is a schematic, front perspective view diagram 600C of an example adjustable package flow stop wall in a third position, in accordance with implementations of the present disclosure.

With reference to the example adjustable package flow stop wall substantially as described with respect to FIGS. 2A-3B, FIG. 6A illustrates the various components in a fully extended or closeout position, FIG. 6B illustrates the various components in an intermediate or active position, and FIG. 6C illustrates the various components in a fully retracted or flush position.

As shown in FIG. 6A, in the fully extended or closeout position, the wall assembly 120 may be extended or moved such that the wall assembly 120 extends above an upper surface of a station, e.g., at a maximum extension of approximately six inches above the upper surface of the station. The frame assembly 130 may be biased to the fully extended or closeout position by the counterweights or other bias elements coupled to or associated with portions of the frame assembly 130. In addition, the pedal assembly 140 may be at a fully undepressed or raised position based on the connections or couplings of the pedal linkages with the frame assembly 130 and/or wall assembly 120 in the fully extended or closeout position.

Further, the handle assembly 150 may be at a fully raised position based on the connections or couplings of the handle assembly 150 with the frame assembly 130 and/or wall assembly 120. Moreover, in the fully raised position, the handle 151 may be positioned at an upper, right side portion of the guide track 159 of the guide plate of the handle assembly 150.

In example embodiments, in the fully extended or closeout position, the wall assembly 120 may facilitate arrival and accumulation of packages in a collection area of a station. In addition, packages may generally not be grasped, lifted, moved, or transferred out of the collection area with the wall assembly 120 in the fully extended or closeout position. However, smaller packages, such as envelopes or individual items or objects, may still be grasped, lifted, moved, or transferred out of the collection area with the wall assembly 120 in the fully extended or closeout position. Moreover, to begin or initiate movement or transfer of packages over and/or across the wall assembly 120, the wall assembly 120 may be pushed, retracted, or moved downward, e.g., by weight of the packages, and/or by operation of the pedal assembly 140 or handle assembly 150 by an agent at the station, from the fully extended or closeout position to the intermediate or active position shown in FIG. 6B.

As shown in FIG. 6B, in the intermediate or active position, the wall assembly 120 may be extended, retracted, or moved such that the wall assembly 120 extends above an upper surface of a station, e.g., at an intermediate extension of approximately three inches above the upper surface of the station. The frame assembly 130 may be biased toward the intermediate or active position, as well as the fully extended or closeout position, by the counterweights or other bias elements coupled to or associated with portions of the frame assembly 130. In addition, the pedal assembly 140 may be at a partially depressed or intermediate lowered position based on the connections or couplings of the pedal linkages with the frame assembly 130 and/or wall assembly 120 in the intermediate or active position.

Further, the handle assembly 150 may be at an intermediate or partially lowered position based on the connections or couplings of the handle assembly 150 with the frame assembly 130 and/or wall assembly 120. Moreover, in the intermediate position, the handle 151 may be positioned at an intermediate, left side portion of the guide track 159 of the guide plate of the handle assembly 150, and a bias element associated with the handle assembly 150 may bias or maintain the handle 151 toward the left side of the guide track 159 as shown in FIG. 6B. As a result, in order to return to the fully extended or closeout position shown in FIG. 6A from the intermediate or active position shown in FIG. 6B, the handle 151 may be moved, pushed, or pulled against a bias force of the bias element associated with the handle assembly 150, such that the handle 151 may then move toward the upper, right side portion of the guide track 159 of the guide plate of the handle assembly 150.

In example embodiments, in the intermediate or active position, the wall assembly 120 may facilitate arrival and accumulation of packages in a collection area of a station. In addition, packages may generally be grasped, lifted, moved, or transferred out of the collection area with the wall assembly 120 in the intermediate or active position. For example, smaller packages, such as envelopes or individual items or objects, may be grasped, lifted, moved, or transferred out of the collection area with the wall assembly 120 in the intermediate or active position. Further, other types of packages, such as small to medium sized boxes or relatively lighter items or objects, may be grasped, lifted, moved, or transferred out of the collection area with the wall assembly 120 in the intermediate or active position. Moreover, packages that may be larger or heavier may also be grasped, lifted, moved, or transferred out of the collection area with the wall assembly 120 in the intermediate or active position. During movement or transfer of any of the packages over and/or across the wall assembly 120, the wall assembly 120 may be pushed or moved downward, e.g., by weight of the packages, and/or by operation of the pedal assembly 140 or handle assembly 150 by an agent at the station, from the intermediate or active position to the fully retracted or flush position shown in FIG. 6C.

As shown in FIG. 6C, in the fully retracted or flush position, the wall assembly 120 may be retracted or moved such that the wall assembly 120 does not extend above and/or is substantially flush with an upper surface of a station, e.g., forms a substantially continuous surface with the upper surface of the station. The frame assembly 130 may be biased toward the intermediate or active position, as well as the fully extended or closeout position, by the counterweights or other bias elements coupled to or associated with portions of the frame assembly 130. In addition, the pedal assembly 140 may be at a fully depressed or lowered position based on the connections or couplings of the pedal linkages with the frame assembly 130 and/or wall assembly 120 in the fully retracted or flush position.

Further, the handle assembly 150 may be at a fully lowered position based on the connections or couplings of the handle assembly 150 with the frame assembly 130 and/or wall assembly 120. Moreover, in the fully lowered position, the handle 151 may be positioned at a lower, left side portion of the guide track 159 of the guide plate of the handle assembly 150, and a bias element associated with the handle assembly 150 may bias or maintain the handle 151 toward the left side of the guide track 159 as shown in FIG. 6C. As a result, the handle 151, due to a bias force of the bias element, may move substantially freely within the guide track 159 between the intermediate position shown in FIG. 6B and the fully lowered position shown in FIG. 6C. For example, actuation of the pedal assembly 140 and/or placement, sliding, pushing, pulling, or transfer of packages in contact with the wall assembly 120 may substantially freely move the wall assembly 120 between the intermediate and flush positions of FIGS. 6B and 6C, without restriction of movement due to the handle 151 and guide track 159.

In example embodiments, in the fully retracted or flush position, the wall assembly 120 may facilitate substantially unhindered or uninhibited transfer of packages from a collection area of a station over and/or across the wall assembly 120. In addition, packages of various sizes, shapes, weights, or other characteristics may generally be grasped, lifted, slid, pushed, pulled, moved, or transferred out of the collection area with the wall assembly 120 in the fully retracted or flush position. During movement or transfer of any of the packages over and/or across the wall assembly 120, the wall assembly 120 may be held or maintained downward, e.g., by weight of the packages, and/or by operation of the pedal assembly 140 or handle assembly 150 by an agent at the station, in the fully retracted or flush position shown in FIG. 6C.

Although FIGS. 6A-6C illustrate three positions of an adjustable package flow stop wall including a fully extended or closeout position, an intermediate or active position, and a fully retracted or flush position, other example embodiments may include any other number of positions of a wall assembly between a fully extended position and a fully retracted position, corresponding positions of a handle and associated guide track of a handle assembly, corresponding positions of a pedal assembly, and corresponding positions of any other assemblies of the adjustable package flow stop wall. For example, some example embodiments may include a plurality of active positions of a wall assembly at different heights relative to the upper surface of a station, with each active position being associated with different sizes, shapes, weights, or other characteristics of packages to be transferred. Further example embodiments may include a plurality of active positions of a wall assembly at different heights relative to the upper surface of a station, with each active position being associated with different heights, reach distances, capabilities, or other ergonomic or occupational characteristics of associates at a station. In various embodiments, a fully extended position of a wall assembly may generally be associated with a non-use or non-operational state or condition of a package processing station.

Figure 7:
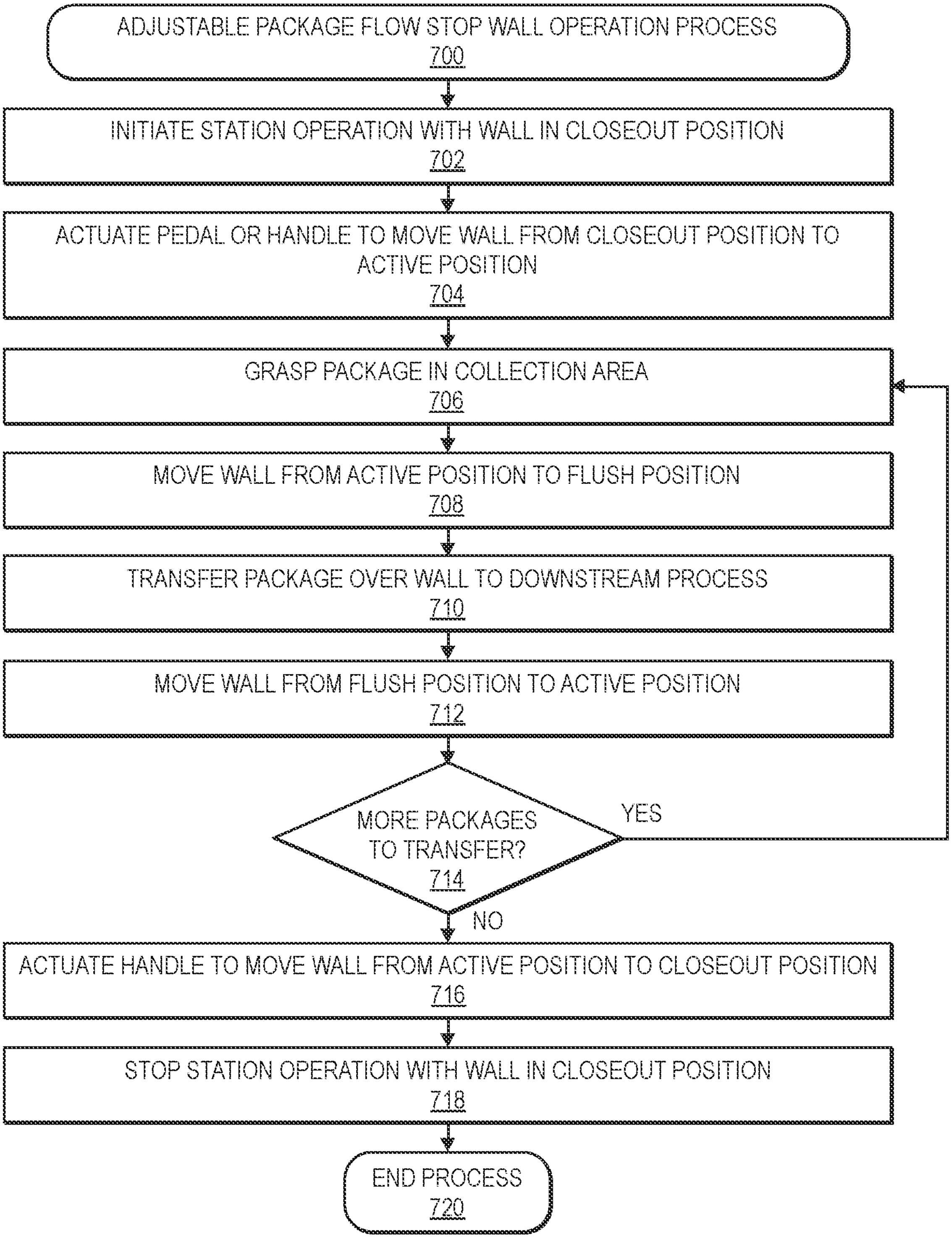
FIG. 7 is a flow diagram illustrating an example adjustable package flow stop wall operation process, in accordance with implementations of the present disclosure.

FIG. 7 is a flow diagram illustrating an example adjustable package flow stop wall operation process 700, in accordance with implementations of the present disclosure.

The process 700 may begin by initiating station operation with a wall in a closeout position, as at 702. For example, the wall assembly of an adjustable package flow stop wall may be initially positioned at a fully extended or closeout position, e.g., at a maximum extension relative to an upper surface of a package processing station. The wall assembly may be positioned at the fully extended position when the station is not in use or not operational, e.g., during off hours, breaks, shift changes, etc. Further, a control system may instruct or command initiation of station operation from a non-use or non-operational status.

The process 700 may continue by actuating a pedal or handle to move the wall from the closeout position to an active position, as at 704. For example, responsive to initiating operation of a package processing station, a pedal assembly and/or handle assembly of an adjustable package flow stop wall may be actuated to move the wall assembly from a fully extended or closeout position to an intermediate or active position, e.g., at an intermediate extension relative to an upper surface of the package processing station. In example embodiments, an agent associated with the station may depress the pedal assembly to move the wall assembly to the active position, and/or the agent may move or push the handle assembly to move the wall assembly to the active position. As described herein, a portion of the handle assembly, e.g., a handle, associated guide track of a guide plate, and bias element, may maintain the wall assembly in the active position. Further, a control system may instruct or command actuation of a pedal or handle to move the wall assembly to the active position.

The process 700 may proceed by grasping a package in a collection area, as at 706. For example, one or more packages may arrive and accumulate in a collection area of the package processing station, while the wall assembly is in the closeout position or the active position. In example embodiments, an agent may grasp a package from the collection area to transfer the package over and/or across the wall assembly toward an outbound conveyance and downstream process or station. The package may comprise various types, including boxes, containers, envelopes, items, or other objects. Further, a control system may instruct or command grasping of a package to process.

The process 700 may continue to move the wall from the active position to a flush position, as at 708. For example, responsive to grasping a package from a collection area, a pedal assembly and/or handle assembly of an adjustable package flow stop wall may be actuated to move the wall assembly from an intermediate or active position to a fully retracted or flush position, e.g., at a position substantially flush with an upper surface of the package processing station. In example embodiments, an agent associated with the station may depress the pedal assembly to move the wall assembly to the flush position, and/or the agent may move or push the handle assembly to move the wall assembly to the flush position. Alternatively, during transfer of the package over the wall assembly, a weight of the grasped package may cause the wall assembly to move to the flush position. In other example embodiments, the wall assembly may remain in the active position and not be moved to the flush position, e.g., responsive to grasping smaller or lighter packages that may be easily transferred over the wall assembly in the active position. Further, a control system may instruct or command actuation of a pedal or handle to move the wall assembly to the flush position.

The process 700 may proceed to transfer the package over the wall to a downstream process, as at 710. For example, responsive to grasping a package from a collection area and/or responsive to moving the wall assembly to the flush position, an agent may transfer the package from the collection area over and/or across the wall assembly toward an outbound conveyance and downstream process or station, e.g., by lifting, sliding, pushing, pulling, or otherwise moving the package. The package may comprise various types, including boxes, containers, envelopes, items, or other objects. Further, a control system may instruct or command transfer of a package over and/or across the wall assembly to a downstream process.

The process 700 may then continue with moving the wall from the flush position to the active position, as at 712. For example, responsive to transferring a package from a collection area to an outbound conveyance and downstream process, a pedal assembly and/or handle assembly of an adjustable package flow stop wall may be actuated to move the wall assembly from the fully retracted or flush position to the intermediate or active position. In example embodiments, an agent associated with the station may release the pedal assembly to move the wall assembly to the active position, and/or the agent may move or pull the handle assembly to move the wall assembly to the active position. Alternatively, during transfer of the package over the wall assembly, a weight of the grasped package may have caused the wall assembly to move to the flush position, and upon transferring the package to the downstream process, the wall assembly may return to the active position, e.g., based on counterweights, springs, dampers, or other bias elements associated with the adjustable package flow stop wall. In other example embodiments, the wall assembly may have remained in the active position during transfer of the package, e.g., responsive to grasping smaller or lighter packages that may be easily transferred over the wall assembly in the active position. Further, a control system may instruct or command actuation of a pedal or handle to move the wall assembly to the active position.

The process 700 may proceed with determining whether there are more packages to transfer, as at 714. For example, an agent may determine whether there are additional packages in the collection area to be processed or transferred. Further, a control system may instruct or command determination of whether there are additional packages to transfer. If it is determined that there are additional packages to transfer, then the process 700 may return to step 706 to grasp another package in a collection area for transfer, and the process 700 may repeat as needed.

If, however, it is determined that there are no additional packages to transfer, then the process 700 may continue by actuating a handle to move the wall from the active position to the closeout position, as at 716. For example, responsive to completing operation of a package processing station, a pedal assembly and/or handle assembly of an adjustable package flow stop wall may be actuated to move the wall assembly from the intermediate or active position to the fully extended or closeout position. In example embodiments, an agent associated with the station may move or pull the handle assembly, while releasing the pedal assembly, to move the wall assembly from the active position to the closeout position. As described herein, a portion of the handle assembly, e.g., a handle, associated guide track of a guide plate, and bias element, may apply a bias force to the handle that may need to be overcome in order to move the wall assembly from the active position to the closeout position. Further, a control system may instruct or command actuation of a handle assembly to move the wall assembly to the closeout position.

The process 700 may then proceed by stopping station operation with the wall in the closeout position, as at 718. For example, the wall assembly of an adjustable package flow stop wall may be finally positioned at a fully extended or closeout position, e.g., at a maximum extension relative to an upper surface of a package processing station. The wall assembly may be positioned at the fully extended position when the station is not in use or not operational, e.g., during off hours, breaks, shift changes, etc. Further, a control system may instruct or command transition of station operation to a non-use or non-operational status.

The process 700 may then end, as at 720.

In additional example embodiments, the example adjustable package flow stop wall described herein may include one or more sensors, one or more actuators, and/or one or more input elements to actuate the wall assembly at least partially or fully automatically.

The one or more sensors of the example adjustable package flow stop wall may comprise scanning or imaging devices, barcode or QR code scanning devices, imaging sensors, depth sensors, photoeyes, presence sensors, proximity sensors, radiofrequency identification (RFID) sensors, or various other types of sensors. In some example embodiments, the one or more sensors may detect and/or identify an agent associated with a station. For example, a barcode or QR code scanning device may detect and identify a barcode, QR code, or other identifier associated with an identification badge, device, or element of an agent, or an RFID reader may detect and identify an RFID tag associated with an identification badge, device, or element of an agent. In addition, one or more imaging devices or imaging sensors may capture and identify an agent at a station, e.g., using various computer vision, image processing, feature detection, person detection, machine learning, and/or other techniques or algorithms. Based on the detected and identified agent, various characteristics associated with the agent may be determined, such as an identity, preferences, ergonomic or occupational characteristics, certifications, qualifications, or other characteristics associated with the agent.

In additional example embodiments, the one or more sensors may detect and/or identify a package to be processed at a station. For example, a barcode or QR code scanning device may detect and identify a barcode, QR code, or other identifier associated with a package, or an RFID reader may detect and identify an RFID tag associated with a package. In addition, one or more imaging devices or imaging sensors may capture and identify a package, e.g., using various computer vision, image processing, feature detection, object detection, machine learning, and/or other techniques or algorithms. Further, various photoeyes, presence sensors, and/or proximity sensors may detect or identify a presence, position, orientation, size, and/or dimensions associated with a package. Based on the detected and identified package, various characteristics associated with the package may be determined, such as an identity, source, contents, position, orientation, size, dimensions, weight, handling rules or exceptions, destination, or other characteristics associated with the package.

In addition, the one or more actuators of the example adjustable package flow stop wall may comprise servos, solenoids, motors, gas or pneumatic cylinders, linear actuators, geared actuators, or various other types of actuators to move the wall assembly at least partially or fully automatically. Various example embodiments of the adjustable package flow stop wall that utilize one or more actuators may not include one or more counterweights, bias elements, springs, dampers, or similar elements or components described herein, and instead, the two or more positions of the wall assembly and corresponding positions of other assemblies may be substantially positively controlled via the one or more actuators.

Further, the one or more input elements may comprise buttons, knobs, handles, pedals, control elements, user interface elements, audio input devices, imaging devices, or other types of input elements to cause actuation of the wall assembly at least partially or fully automatically. In some example embodiments, one or more of the movements of the wall assembly may be instructed or commanded based on inputs received from an agent via one or more input elements. In additional example embodiments, one or more of the movements of the wall assembly may be instructed or commanded based on voice inputs or commands received from an agent via audio input devices such as microphones or audio transducers. In further example embodiments, one or more of the movements of the wall assembly may be instructed or commanded based on hand, arm, foot, gesture, or other movement inputs received from an agent via one or more imaging devices.

Various example embodiments of the adjustable package flow stop wall that utilize one or more sensors, actuators, and/or input elements may not include pedal assemblies and/or handle assemblies as described herein, as the two or more positions of the wall assembly and corresponding positions of other assemblies may be substantially instructed or commanded via the one or more input elements. However, in some example embodiments, a pedal or handle may be provided as an input element that causes transmission of one or more actuation signals to the one or more actuators, although the pedal or handle may not be mechanically coupled to the wall assembly to cause movement thereof. In still other example embodiments, a pedal assembly and/or handle assembly may still be provided that is mechanically coupled to the wall assembly to cause movement thereof, and the pedal assembly and/or handle assembly may be utilized as a mechanical safety override by an agent at a station.

In some example embodiments, the one or more actuators may move the wall assembly of an adjustable package flow stop wall between two or more positions relative to an upper surface of a station substantially automatically. For example, based on an identification of an agent who is operating a station, e.g., based on data from one or more sensors, the wall assembly may be moved automatically from a closeout position to an active position. In addition, based on an identification of a package that is grasped by the agent at the station, e.g., based on data from one or more sensors, the wall assembly may be moved automatically from an active position to a flush position to facilitate transfer and processing of the package. After transfer of the package, e.g., based on data from one or more sensors, the wall assembly may be moved automatically back from the flush position to the active position. Further, upon completion or stopping of an agent's operation at a station, e.g., based on data from one or more sensors, the wall assembly may be moved automatically back from the active position to the closeout position. In this manner, based on identifications of an agent and/or identifications of one or more packages using data from one or more sensors, the wall assembly may be substantially automatically moved between two or more positions to facilitate operations at a package processing station. Further, various example embodiments of the adjustable package flow stop wall that utilize one or more sensors and/or actuators to move the wall assembly substantially automatically may not include pedal assemblies and/or handle assemblies as described herein.

In further example embodiments, different agents may have different associated preferences and/or ergonomic or occupational characteristics, e.g., data related to heights, reach distances, loads or weights, shift durations, or other types of ergonomic or operator safety data. As a result, different agents may be able to lift different types, sizes, and weights of packages to different heights, over different durations of time, for different numbers of iterations, etc. The ergonomic or occupational characteristics associated with agents may be stored, processed, and used to determine various defined positions of the wall assembly of the adjustable package flow stop wall described herein that are associated with particular agents. Then, during the at least partially or fully automated operation of the adjustable package flow stop wall, the wall assembly may be automatically moved to the particular defined positions, e.g., closeout, active, flush, or other positions, that have been determined for the particular agent, and furthermore, based on characteristics of different packages that are grasped and processed by the particular agent. In this manner, the operations of the wall assembly of the adjustable package flow stop wall described herein may be particularly tailored substantially automatically to provide safe, ergonomic, and efficient operation for individual agents as they process individual packages at a package processing station.

In still further example embodiments, additional data associated with agents, their preferences and/or ergonomic or occupational characteristics, packages and their characteristics, successful operations associated with packages or agents, safety issues associated with packages or agents, or other similar data may be continuously gathered, updated, and processed, e.g., using various machine learning techniques or algorithms, to further refine and improve the various defined positions of the wall assembly of the adjustable package flow stop wall described herein that are associated with particular agents and/or particular packages. In this manner, the safety and efficiency of package processing operations using the adjustable package flow stop wall described herein may be continuously improved over time.

Figure 8:
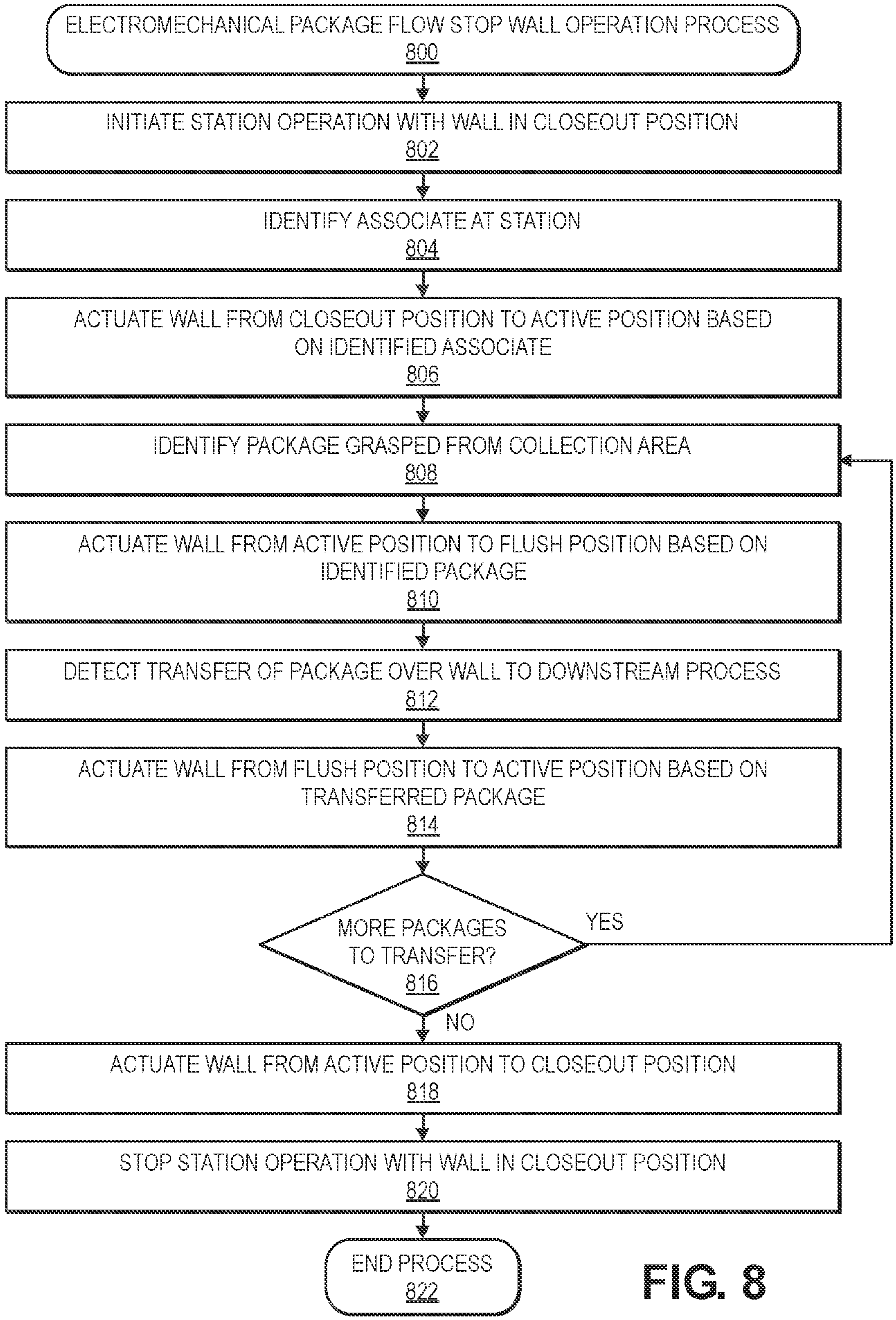
FIG. 8 is a flow diagram illustrating an example electromechanical package flow stop wall operation process, in accordance with implementations of the present disclosure.

FIG. 8 is a flow diagram illustrating an example electromechanical package flow stop wall operation process 800, in accordance with implementations of the present disclosure.

The process 800 may begin by initiating station operation with a wall in a closeout position, as at 802. For example, the wall assembly of an adjustable package flow stop wall may be initially positioned at a fully extended or closeout position, e.g., at a maximum extension relative to an upper surface of a package processing station. The wall assembly may be positioned at the fully extended position when the station is not in use or not operational, e.g., during off hours, breaks, shift changes, etc. Further, a control system may instruct or command initiation of station operation from a non-use or non-operational status.

The process 800 may proceed by identifying an associate at a station, as at 804. For example, one or more sensors associated with a station may detect and identify an agent or associate, e.g., using barcode or QR code scanning or imaging devices, RFID readers and tags, imaging sensors and computer vision, person detection, or other image processing techniques or algorithms, or other combinations of sensors, sensor data, and associated data processing algorithms. In additional example embodiments, an agent may scan an identification badge or device, or log in or sign in using various input/output devices, to initiate operation of a station, based upon which the agent may be identified. Based on the detected or identified agent, one or more characteristics associated with the agent may be determined, such as an identity, preferences, ergonomic or occupational characteristics, certifications, qualifications, or other characteristics associated with the agent, e.g., with reference to a datastore, table, or other data stored in memory. As described herein, one or more positions of a wall assembly of the adjustable package flow stop wall may be defined and associated with the identified agent. Further, a control system may instruct or command identification of the agent at the station, as well as determination of one or more characteristics associated with the agent.

The process 800 may continue by actuating the wall from the closeout position to an active position based on the identified associate, as at 806. For example, responsive to initiating operation of a package processing station by an identified agent, the wall assembly of the adjustable package flow stop wall may be actuated to move from a fully extended or closeout position to an intermediate or active position, e.g., at an intermediate extension relative to an upper surface of the package processing station. In example embodiments, one or more actuators associated with the wall assembly may move the wall assembly to the active position. As described herein, one or more active positions of a wall assembly of the adjustable package flow stop wall may be defined and associated with the identified agent. Further, a control system may instruct or command actuation of the wall assembly to move to the active position.

The process 800 may proceed by identifying a package grasped from a collection area, as at 808. For example, one or more packages may arrive and accumulate in a collection area of the package processing station, while the wall assembly is in the closeout position or the active position. In example embodiments, an agent may grasp a package from the collection area to transfer the package over and/or across the wall assembly toward an outbound conveyance and downstream process or station. In addition, one or more sensors associated with a station may detect and identify the package, e.g., using barcode or QR code scanning or imaging devices, RFID readers and tags, imaging sensors and computer vision, object detection, or other image processing techniques or algorithms, or other combinations of sensors, sensor data, and associated data processing algorithms. The package may comprise various types, including boxes, containers, envelopes, items, or other objects. Based on the detected or identified package, one or more characteristics associated with the package, such as identity, source, contents, size, position, orientation, dimensions, weight, handling rules or exceptions, destination, or other characteristics, e.g., with reference to a datastore, table, or other data stored in memory. As described herein, one or more positions of a wall assembly of the adjustable package flow stop wall may be defined and associated with various types of packages, as well as different characteristics of packages. Further, a control system may instruct or command identification of the package grasped at the station, as well as determination of one or more characteristics associated with the package.

The process 800 may continue to actuate the wall from the active position to a flush position based on the identified package, as at 810. For example, responsive to identifying a package grasped from a collection area, the wall assembly of the adjustable package flow stop wall may be actuated to move from the intermediate or active position to a fully retracted or flush position, e.g., at a position substantially flush with an upper surface of the package processing station. In example embodiments, one or more actuators associated with the wall assembly may move the wall assembly to the flush position. As described herein, one or more active, flush, or other positions of a wall assembly of the adjustable package flow stop wall may be defined and associated with the identified agent. In some example embodiments, the wall assembly may not be moved from the active position to the flush position, or may be moved to one or more intermediate positions between the active position and the flush position, e.g., based on determining that the identified package is small, lightweight, and/or easy to transfer over the wall assembly in the active position or other intermediate positions. In other example embodiments, the wall assembly may move from the active position to the flush position, e.g., based on determining that the identified package is large, heavy, and/or difficult to transfer over the wall assembly in the active position. Further, a control system may instruct or command actuation of the wall assembly to move to the flush position.

The process 800 may proceed to detect transfer of the package over the wall to a downstream process, as at 812. For example, responsive to identifying a package grasped from a collection area and/or responsive to moving the wall assembly to the flush position, an agent may transfer the package from the collection area over and/or across the wall assembly toward an outbound conveyance and downstream process or station, e.g., by lifting, sliding, pushing, pulling, or otherwise moving the package. In addition, one or more sensors associated with a station may detect and identify transfer of the package, e.g., using barcode or QR code scanning or imaging devices, RFID readers and tags, imaging sensors and computer vision, object detection, optical flow, or other image processing techniques or algorithms, or other combinations of sensors, sensor data, and associated data processing algorithms. Based on detecting transfer of the package, it may be determined whether the package has been successfully transferred from the collection area over and/or across the wall assembly to the outbound conveyance. Further, a control system may instruct or command detection of transfer of a package over and/or across the wall assembly to a downstream process.

The process 800 may then continue with actuating the wall from the flush position to the active position based on the transferred package, as at 814. For example, responsive to detecting transfer of a package from a collection area to an outbound conveyance and downstream process, the wall assembly of the adjustable package flow stop wall may be actuated to move from the fully retracted or flush position back to the intermediate or active position. In example embodiments, one or more actuators associated with the wall assembly may move the wall assembly to the active position. As described herein, one or more active, flush, or other positions of a wall assembly of the adjustable package flow stop wall may be defined and associated with the identified agent. In some example embodiments, the wall assembly may not have been moved from the active position to the flush position, or may have been moved to one or more intermediate positions between the active position and the flush position, e.g., based on determining that the identified package is small, lightweight, and/or easy to transfer over the wall assembly in the active position or other intermediate positions. As a result, the wall assembly may already be in the active position, may move to the active position from various intermediate positions, and/or may move to the active position from the flush position. Further, a control system may instruct or command actuation of the wall assembly to move to the active position.

The process 800 may proceed with determining whether there are more packages to transfer, as at 816. For example, one or more packages may arrive and accumulate in a collection area of the package processing station, while the wall assembly is in the active, flush, or other intermediate positions. In example embodiments, one or more sensors associated with a station may detect presence of one or more packages, e.g., using barcode or QR code scanning or imaging devices, RFID readers and tags, imaging sensors and computer vision, object detection, or other image processing techniques or algorithms, photoeyes, presence sensors, proximity sensors, or other combinations of sensors, sensor data, and associated data processing algorithms. The packages may comprise various types, including boxes, containers, envelopes, items, or other objects. Furthermore, one or more sensors associated with a station may detect and identify continued operation of the station by an agent or associate, e.g., using barcode or QR code scanning or imaging devices, RFID readers and tags, imaging sensors and computer vision, person detection, or other image processing techniques or algorithms, or other combinations of sensors, sensor data, and associated data processing algorithms. In additional example embodiments, an agent may scan an identification badge or device, or log out or sign out using various input/output devices, to stop or cease operation of a station. Further, a control system may instruct or command detection and determination of whether there are additional packages to transfer, as well as whether the agent is continuing operation of the station. If it is determined that there are additional packages to transfer and/or continued operation by an agent, then the process 800 may return to step 808 to identify another package grasped from a collection area for transfer by an agent, and the process 800 may repeat as needed.

If, however, it is detected and determined that there are no additional packages to transfer and/or discontinued operation by an agent, then the process 800 may continue by actuating the wall from the active position to the closeout position, as at 818. For example, responsive to determining that no additional packages are to be transferred, and/or responsive to discontinuing operation of a package processing station by an identified agent, the wall assembly of the adjustable package flow stop wall may be actuated to move from the intermediate or active position to the fully extended or closeout position. In example embodiments, one or more actuators associated with the wall assembly may move the wall assembly to the closeout position. Further, a control system may instruct or command actuation of the wall assembly to move to the closeout position.

The process 800 may then proceed by stopping station operation with the wall in the closeout position, as at 820. For example, the wall assembly of an adjustable package flow stop wall may be finally positioned at a fully extended or closeout position, e.g., at a maximum extension relative to an upper surface of a package processing station. The wall assembly may be positioned at the fully extended position when the station is not in use or not operational, e.g., during off hours, breaks, shift changes, etc. Further, a control system may instruct or command transition of station operation to a non-use or non-operational status.

The process 800 may then end, as at 822.

Figure 9:
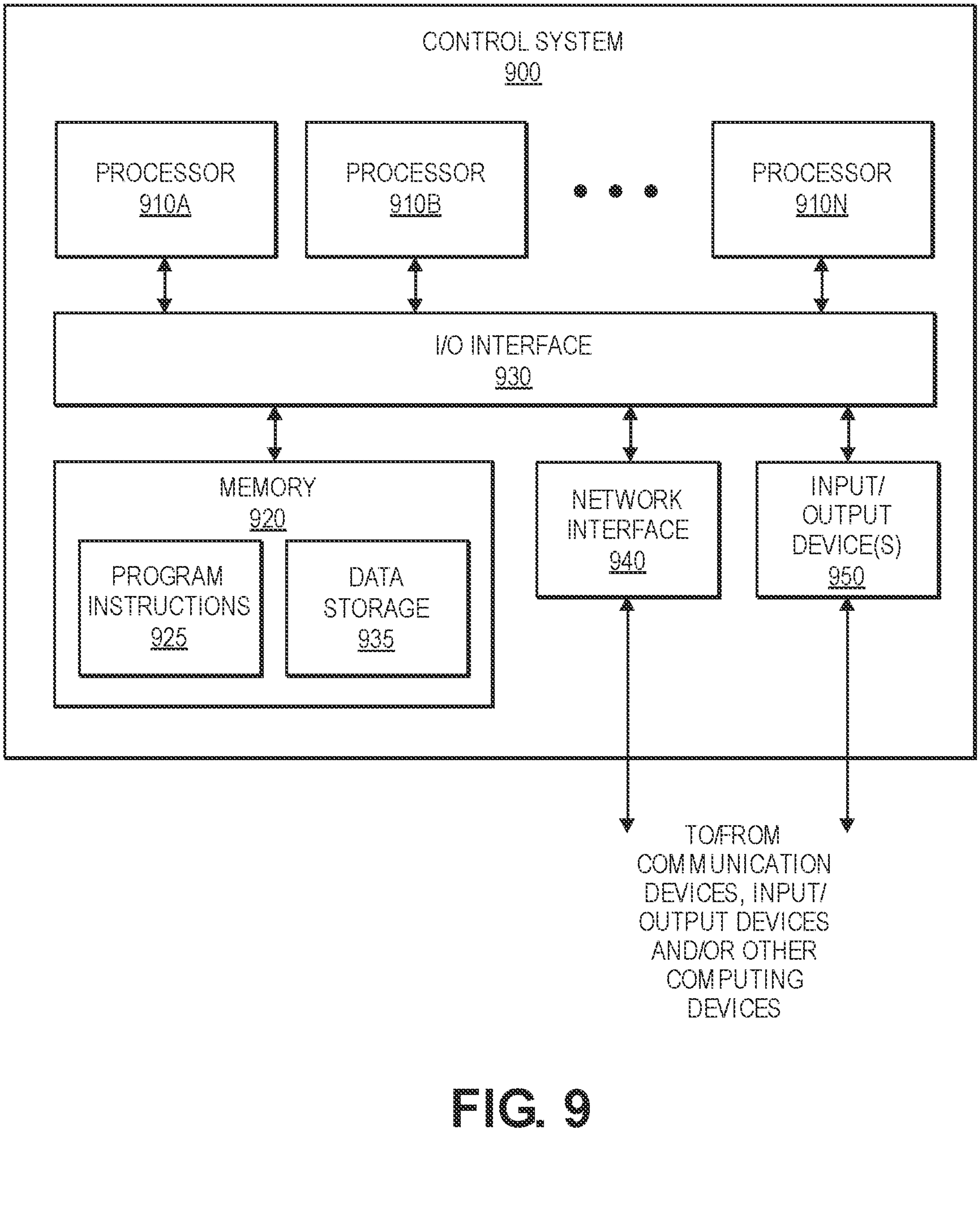
FIG. 9 is a block diagram illustrating various components of an example control system, in accordance with implementations of the present disclosure.

FIG. 9 is a block diagram illustrating various components of an example control system 900, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 9. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950. In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to portions of adjustable package flow stop wall systems, operations, or processes, etc.) may be implemented via one or more nodes of the control system 900 that are distinct from those nodes implementing other data sources or services (e.g., related to other portions of adjustable package flow stop wall systems, operations, or processes, etc.).

In various implementations, the control system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as other control systems, material handling system controllers, warehouse management systems, other computer systems, conveyance systems, autonomous mobile robots, robotic drive units, robotic arms, machines, or systems, adjustable package flow stop wall systems, assemblies, or controllers, various types of sensors, actuators, and/or input elements, various visual and/or audio input/output devices, upstream stations or processes, downstream stations or processes, other material handling systems or equipment, or between nodes of the control system 900. In various implementations, the network interface 940 may support communication via wired or wireless general data networks, such as any suitable type of Ethernet network.

Input/output devices 950 may, in some implementations, include one or more visual input/output devices, displays, projection devices, audio input/output devices, microphones, speakers, keyboards, keypads, touchscreens, touchpads, scanning devices, imaging devices, photoeyes, presence sensors, proximity sensors, RFID readers, various other sensors described herein, voice or optical recognition devices, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 900 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate adjustable package flow stop wall operations and processes described herein, such as inbound conveyance controllers, drivers, or applications, visual and/or audio input/output device controllers, drivers, or applications, sensor controllers, drivers, or applications, sensor data processing applications, actuator controllers, drivers, or applications, input element controllers, drivers, or applications, adjustable package flow stop wall controllers, drivers, or applications, various assembly controllers, drivers, or applications, outbound conveyance controllers, drivers, or applications, material handling equipment controllers, drivers, or applications, upstream station controllers, drivers, or applications, downstream station controllers, drivers, or applications, etc. The data storage 935 may include various data stores for maintaining data related to systems, operations, or processes described herein, such as inbound conveyance, adjustable package flow stop wall apparatus or systems, wall assemblies, frame assemblies, pedal assemblies, handle assemblies, sensors, sensor data, actuators, input elements, agents or associates, agent characteristics, packages, package characteristics, closeout, active, flush, or various other positions of wall assemblies and other assemblies, outbound conveyance, material handling equipment or apparatus, upstream systems, stations, or processes, downstream systems, stations, or processes, etc.

Those skilled in the art will appreciate that the control system 900 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 7 and 8, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as “a” or “an” should generally be interpreted to include one or more described items. Accordingly, phrases such as “a device configured to” are intended to include one or more recited devices. Such one or more recited devices can also be collectively configured to carry out the stated recitations. For example, “a processor configured to carry out recitations A, B and C” can include a first processor configured to carry out recitation A working in conjunction with a second processor configured to carry out recitations B and C.

Language of degree used herein, such as the terms “about,” “approximately,” “generally,” “nearly” or “substantially” as used herein, represent a value, amount, or characteristic close to the stated value, amount, or characteristic that still performs a desired function or achieves a desired result. For example, the terms “about,” “approximately,” “generally,” “nearly” or “substantially” may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An adjustable package flow stop wall for a package processing station, comprising:

a frame assembly pivotally coupled to an underside of the package processing station;

a wall assembly rigidly coupled to the frame assembly, the wall assembly positioned between a package collection area of the package processing station and a work surface proximate an agent position of the package processing station;

a pedal assembly operatively coupled to the wall assembly; and a handle assembly operatively coupled to the wall assembly;

wherein each of the pedal assembly and the handle assembly is configured to selectively move the wall assembly between a plurality of positions relative to an upper surface of the package processing station; and wherein the wall assembly is configured to selectively extend above the upper surface of the package processing station to facilitate package processing by an agent at the agent position of the package processing station.

2. The adjustable package flow stop wall of claim 1, wherein the frame assembly comprises at least one of a counterweight, a spring, or a damper configured to bias the wall assembly toward a closeout position;

wherein the wall assembly extends above the upper surface at the closeout position.

3. The adjustable package flow stop wall of claim 2, wherein the plurality of positions includes the closeout position, an active position, and a flush position;

wherein an upper portion of the wall assembly is at maximum extension above the upper surface at the closeout position;

wherein the upper portion of the wall assembly is at intermediate extension above the upper surface at the active position; and wherein the upper portion of the wall assembly is flush with the upper surface at the flush position.

4. The adjustable package flow stop wall of claim 1, wherein the handle assembly comprises a handle and a guide plate;

wherein the guide plate is configured to receive a portion of the handle and selectively maintain the handle in at least one of a plurality of positions that corresponds to at least one of the plurality of positions of the wall assembly.

5. The adjustable package flow stop wall of claim 1, wherein in at least some of the plurality of positions, the wall assembly separates the package collection area from the work surface, and the wall assembly causes accumulation of packages in the package collection area.

6. An apparatus, comprising:

a frame assembly associated with a station; and a wall assembly coupled to the frame assembly, the wall assembly positioned between a collection area of the station and a work surface proximate an agent position of the station; and wherein the wall assembly is configured to selectively move between at least two positions relative to an upper surface of the station to facilitate item processing by an agent at the agent position of the station;

wherein the at least two positions of the wall assembly include at least a retracted position and an extended position;

wherein in the retracted position, the wall assembly is at a first height relative to the upper surface of the station; and wherein in the extended position, the wall assembly extends above the upper surface of the station a second height that is greater than the first height to substantially cause accumulation of items in the collection area.

7. The apparatus of claim 6, wherein the frame assembly is pivotally coupled to an underside of the station.

8. The apparatus of claim 6, wherein the frame assembly comprises at least one of a counterweight, a spring, or a damper configured to bias the wall assembly toward the extended position.

9. The apparatus of claim 6, wherein the wall assembly is rigidly coupled to the frame assembly; and wherein the wall assembly comprises a wall having a curvature based on a pivoting movement of the frame assembly relative to the station.

10. The apparatus of claim 6, wherein the wall assembly comprises an upper surface including at least one of rollers, wheels, balls, or low friction material to facilitate sliding of items over the wall assembly.

11. The apparatus of claim 6, wherein the at least two positions of the wall assembly further includes an intermediate position;

wherein in the intermediate position, the wall assembly extends above the upper surface of the station a third height that is less than the second height but greater than the first height; and wherein in the retracted position, the first height of the wall assembly is substantially flush with the upper surface of the station to substantially allow movement of items across the wall assembly.

12. The apparatus of claim 6, further comprising:

a pedal assembly operatively coupled to the wall assembly;

wherein the pedal assembly is configured to selectively move the wall assembly between the at least two positions relative to the upper surface of the station.

13. The apparatus of claim 6, further comprising:

a handle assembly operatively coupled to the wall assembly;

wherein the handle assembly is configured to selectively move the wall assembly between the at least two positions relative to the upper surface of the station.

14. The apparatus of claim 13, wherein the handle assembly comprises a handle and a guide plate;

wherein the guide plate is configured to receive a portion of the handle and selectively maintain the handle in at least one position that corresponds to at least one of the at least two positions of the wall assembly.

15. The apparatus of claim 14, wherein the handle assembly comprises a bias element configured to bias the handle relative to the guide plate to selectively maintain the handle in the at least one position that corresponds to at least one of the at least two positions of the wall assembly.

16. A method, comprising:

causing movement of a wall assembly between at least two positions relative to an upper surface of a station to facilitate item processing at the station, the wall assembly being positioned between a collection area of the station and a work surface proximate an agent position of the station; and instructing transfer, by an agent at the agent position, of an item across the wall assembly in a first position of the at least two positions;

wherein the first position of the at least two positions of the wall assembly includes a first height relative to the upper surface; and wherein a second position of the at least two positions of the wall assembly includes a second height that is greater than the first height, the second position configured to cause accumulation of items in the collection area.

17. The method of claim 16, wherein the movement of the wall assembly is caused by an actuator operatively coupled to the wall assembly; and wherein at least one of a pedal assembly or a handle assembly is operatively coupled to the wall assembly and comprises an input element to activate the actuator.

18. The method of claim 16, further comprising:

receiving, via a sensor, data associated with the agent at the agent position of the station; and identifying at least one characteristic of the agent based on the data;

wherein the movement of the wall assembly is instructed based at least in part on the at least one characteristic of the agent at the station.

19. The method of claim 16, further comprising:

receiving, via a sensor, data associated with the item; and identifying at least one characteristic of the item based on the data;

wherein the movement of the wall assembly is instructed based at least in part on the at least one characteristic of the item transferred by the agent at the station.

* * * * *